US009345342B1

(12) United States Patent
Nagy et al.

(10) Patent No.: US 9,345,342 B1
(45) Date of Patent: May 24, 2016

(54) EARTHQUAKE-ACTIVATED SHELF SECURITY SYSTEM

(71) Applicants: Giselle F Nagy, Valley Village, CA (US); Michael B Nagy, Agoura Hills, CA (US)

(72) Inventors: Giselle F Nagy, Valley Village, CA (US); Michael B Nagy, Agoura Hills, CA (US)

( * ) Notice: Subject to any disclaimer, the term of this patent is extended or adjusted under 35 U.S.C. 154(b) by 0 days.

(21) Appl. No.: 14/968,860

(22) Filed: Dec. 14, 2015

Related U.S. Application Data

(60) Continuation-in-part of application No. 14/827,807, filed on Aug. 17, 2015, now Pat. No. 9,211,010, which is a division of application No. 13/445,729, filed on Apr. 12, 2012, now Pat. No. 9,107,501.

(60) Provisional application No. 61/560,668, filed on Nov. 26, 2011, provisional application No. 61/540,431, filed on Sep. 28, 2011, provisional application No. 61/498,698, filed on Jun. 20, 2011, provisional application No. 61/491,145, filed on May 27, 2011, provisional application No. 61/483,577, filed on May 6, 2011, provisional application No. 61/474,715, filed on Apr. 12, 2011.

(51) Int. Cl.
| | |
|---|---|
| *A47F 5/00* | (2006.01) |
| *A47B 96/06* | (2006.01) |
| *A47B 81/00* | (2006.01) |
| *A47B 96/02* | (2006.01) |
| *A47B 97/00* | (2006.01) |

(52) U.S. Cl.
CPC . *A47F 5/00* (2013.01); *A47B 81/00* (2013.01); *A47B 96/02* (2013.01); *A47B 96/06* (2013.01); *A47B 2097/008* (2013.01)

(58) Field of Classification Search
CPC ........ A47B 96/00; A47B 96/02; A47B 97/00; A47B 2097/008; B65G 2207/40
USPC ............. 211/1, 134, 180, 183; 182/112; 248/499; 108/1, 27, 55; 312/216
See application file for complete search history.

(56) References Cited

U.S. PATENT DOCUMENTS

| | | | | | |
|---|---|---|---|---|---|
| 738,788 | A | * | 9/1903 | Frank | F25D 25/02 211/153 |
| 1,075,652 | A | * | 10/1913 | Kleber, Jr. | A47B 63/02 292/285 |
| 2,553,980 | A | * | 5/1951 | Ostrander | A01K 73/12 160/327 |
| 3,865,448 | A | * | 2/1975 | Winterheimer | F25D 25/02 211/134 |
| 3,877,580 | A | * | 4/1975 | Hammar | A47B 57/581 108/27 |

(Continued)

FOREIGN PATENT DOCUMENTS

| | | | |
|---|---|---|---|
| CA | 2442905 A1 | * 10/2002 | |
| CA | 2498450 A1 | * 9/2005 | A47F 7/0021 |

(Continued)

*Primary Examiner* — Stanton L Krycinski
(74) *Attorney, Agent, or Firm* — Mark David Torche; Patwrite LLC

(57) ABSTRACT

An earthquake-activated shelf security system has two guide rails attached to both sides of a shelf or pallet rack. At least one retainer is moveably constrained to move along the guide rails by a rotating loop located on each end of the retainer. The guide rail has a retainer rest portion and allows the retainer to rest in a prepared configuration without moving down the rail unless acted upon by a shaking event such as an earthquake. A movable backstop may be provided to allow the user to adjust the sensitivity of the system to earthquakes. A mesh net that rolls down may be provided to provide additional security to items being stored on the shelf.

6 Claims, 26 Drawing Sheets

(56) References Cited

U.S. PATENT DOCUMENTS

| | | | | |
|---|---|---|---|---|
| 4,867,318 A * | 9/1989 | Robson | A47B 81/068 | 211/184 |
| 4,981,225 A * | 1/1991 | Cole | B65G 1/02 | 211/180 |
| 5,038,689 A * | 8/1991 | Duffy | A47B 65/00 | 108/108 |
| 5,152,562 A * | 10/1992 | Stevenson | E05B 15/093 | 292/252 |
| 5,170,829 A * | 12/1992 | Duncan | B65G 1/02 | 160/194 |
| 5,567,029 A * | 10/1996 | Haenisch | F25D 23/04 | 211/100 |
| 5,573,125 A * | 11/1996 | Denny | A47B 96/00 | 160/84.01 |
| 5,588,724 A * | 12/1996 | Emery | A47B 77/02 | 312/216 |
| 5,601,198 A * | 2/1997 | Reed | A47B 96/02 | 211/180 |
| 5,791,501 A * | 8/1998 | Baldwin, Jr. | A47B 97/00 | 108/27 |
| 5,860,535 A * | 1/1999 | Brown | A47B 65/00 | 211/184 |
| 5,984,121 A * | 11/1999 | Cole | B65G 1/02 | 211/183 |
| 6,138,583 A * | 10/2000 | Mahone | A47B 47/00 | 108/108 |
| 6,186,274 B1 * | 2/2001 | Reynolds | A62B 1/22 | 182/112 |
| 6,422,406 B1 * | 7/2002 | Kessel | A47B 47/03 | 211/181.1 |
| 6,585,122 B2 * | 7/2003 | Calleja | A47F 5/01 | 211/180 |
| 6,609,621 B2 * | 8/2003 | Denny | A47B 47/021 | 211/180 |
| 6,619,490 B2 * | 9/2003 | Calleja | A47F 5/01 | 211/180 |
| 6,641,236 B2 * | 11/2003 | Grudzien | E05B 65/467 | 296/37.6 |
| 6,672,546 B2 * | 1/2004 | Calleja | A47F 7/0021 | 248/58 |
| 6,698,604 B2 * | 3/2004 | Denny | A47B 47/021 | 182/138 |
| 6,722,512 B2 * | 4/2004 | Scully | A47F 5/13 | 211/175 |
| 6,837,388 B2 * | 1/2005 | Calleja | A47F 5/01 | 182/138 |
| 6,877,621 B1 * | 4/2005 | May | A47F 5/0081 | 211/104 |
| 6,938,785 B2 * | 9/2005 | Denny | A47F 13/00 | 211/183 |
| 7,014,053 B2 * | 3/2006 | Calleja | A47F 5/01 | 182/138 |
| 7,150,361 B2 * | 12/2006 | Calleja | A47F 7/0021 | 182/112 |
| 7,156,475 B2 * | 1/2007 | Gloger, Jr. | A47B 81/00 | 312/216 |
| 7,191,907 B2 * | 3/2007 | Conway | A47B 47/027 | 182/138 |
| 7,850,013 B1 * | 12/2010 | Kramer | E05B 73/0082 | 211/26 |
| 8,359,986 B2 * | 1/2013 | Sekiguchi | E05G 1/06 | 109/53 |
| 8,616,387 B2 * | 12/2013 | Romeiro | A47F 5/0081 | 211/183 |
| 2002/0144965 A1 * | 10/2002 | Calleja | A47F 5/01 | 211/183 |
| 2002/0144966 A1 * | 10/2002 | Calleja | A47F 5/01 | 211/183 |
| 2002/0148799 A1 * | 10/2002 | Denny | A47B 47/021 | 211/186 |
| 2002/0158034 A1 * | 10/2002 | Denny | A47B 47/021 | 211/189 |
| 2003/0127406 A1 * | 7/2003 | Calleja | A47F 5/01 | 211/183 |
| 2004/0020886 A1 * | 2/2004 | Scully | A47F 5/13 | 211/183 |
| 2004/0080105 A1 * | 4/2004 | Stevenson | B07C 7/02 | 271/278 |
| 2004/0182809 A1 * | 9/2004 | Calleja | A47F 5/132 | 211/180 |
| 2004/0211740 A1 * | 10/2004 | Denny | A47F 13/00 | 211/183 |
| 2005/0000928 A1 * | 1/2005 | Calleja | B65G 1/00 | 211/183 |
| 2005/0056605 A1 * | 3/2005 | Calleja | A47F 5/01 | 211/183 |
| 2005/0199569 A1 * | 9/2005 | Calleja | A47F 7/0021 | 211/189 |
| 2005/0224436 A1 * | 10/2005 | Rosiello | B65G 1/02 | 211/180 |
| 2005/0258119 A1 * | 11/2005 | Calleja | B65G 1/00 | 211/183 |
| 2005/0263470 A1 * | 12/2005 | Horneland | A47B 47/021 | 211/183 |
| 2007/0029273 A1 * | 2/2007 | Dean | A47F 5/0068 | 211/183 |
| 2007/0187349 A1 * | 8/2007 | Calleja | A47B 96/00 | 211/189 |
| 2008/0083685 A1 * | 4/2008 | Chen | A47F 5/0018 | 211/134 |
| 2010/0102015 A1 * | 4/2010 | Benneche | A47B 97/00 | 211/183 |
| 2011/0049074 A1 * | 3/2011 | Woolard | B65G 1/02 | 211/191 |
| 2011/0068943 A1 * | 3/2011 | Lane, Jr. | B65G 1/02 | 340/668 |

FOREIGN PATENT DOCUMENTS

| | | | | |
|---|---|---|---|---|
| DE | 29704011 U1 * | 7/1997 | | A47B 47/021 |
| JP | 04347268 A * | 12/1992 | | |
| JP | 09078925 A * | 3/1997 | | |
| JP | 09094125 A * | 4/1997 | | |
| JP | 09173170 A * | 7/1997 | | |
| JP | 11103984 A * | 4/1999 | | |
| JP | 11196963 A * | 7/1999 | | |
| JP | 2002112845 A * | 4/2002 | | |
| JP | 2005021641 A * | 1/2005 | | A47F 5/01 |
| JP | 2005052603 A * | 3/2005 | | |
| JP | 2005312565 A * | 11/2005 | | |
| JP | 2006297023 A * | 11/2006 | | |
| JP | 2007051391 A * | 3/2007 | | |
| JP | 2007252462 A * | 10/2007 | | |
| JP | 2010187850 A * | 9/2010 | | |
| JP | 2010194157 A * | 9/2010 | | |
| JP | 2011125670 A * | 6/2011 | | |
| JP | 2011200478 A * | 10/2011 | | |
| JP | 2012105820 A * | 6/2012 | | |
| WO | WO 9835594 A1 * | 8/1998 | | A47B 96/02 |
| WO | WO 2006047345 A2 * | 5/2006 | | B64F 1/32 |
| WO | WO 2013151445 A1 * | 10/2013 | | A47B 97/00 |

* cited by examiner

EARTHQUAKE-ACTIVATED SHELF SECURITY SYSTEM

CROSS REFERENCE TO RELATED APPLICATIONS

This application is a continuation-in-part of application Ser. No. 14/827,807, filed on Aug. 17, 2015, now U.S. Pat. No. 9,211,010 which is a divisional of application Ser. No. 13/445,729, filed on Apr. 12, 2012, now U.S. Pat. No. 9,107,501 issued Aug. 18, 2015, and claims priority to Provisional Application Ser. Nos. 61/474,715, filed on Apr. 12, 2011, 61/483,577, filed on May 6, 2011, 61/491,145, filed on May 27, 2011, 61/498,698, filed on Jun. 20, 2011, 61/540,431, filed on Sep. 28, 2011 and 61/560,668, filed on Nov. 16, 2011, the complete disclosures of each of which are hereby incorporated by reference.

BACKGROUND OF THE INVENTION

There are generally over a million earthquake events every year with over a thousand of them being over magnitude 5.0. The National Earthquake Information Center (NEIC) reports about 50 earthquakes per day. We have made great progress in building our structures to be able to withstand most earthquakes which has helped to lower the cost in human life during these events, however, earthquakes still cause a tremendous amount of economic damage.

Grocery and other retail stores, laboratories, lumber yards, and warehouses and almost anyone who stores things on shelves can lose a lot of money when even a minor earthquake hits. Many items can be damaged or destroyed when falling from the shelves on which they are stored on. To help with this problem, it is known to add straps, bars and other barriers across the front of the shelves; however, these fixes make the items stored on the shelves harder to access and detract from the esthetic look of the shelves. Since earthquake events are random events, having to put up with these disadvantages are difficult since most of the time, the protections are not needed. Some systems require user activation on the first warning of the quake and this is an obvious disadvantage since most earthquakes are not predictable.

There is a need for an easy to use, non-obtrusive earthquake-activated shelf security system that is reliable, cost efficient and not esthetically distractive. There is also a need for an earthquake-activated shelf security system that can be used with existing shelf systems.

SUMMARY OF THE INVENTION

An earthquake-activated shelf security system has two guide rails attached to both sides of a shelf or pallet rack. At least one retainer is moveably constrained to move along the guide rails by a rotating loop located on each end of the retainer. The guide rail has a retainer rest portion and allows the retainer to rest in a prepared configuration without moving down the rail unless acted upon by a shaking event such as an earthquake. A movable backstop may be provided to allow the user to adjust the sensitivity of the system to earthquakes. A mesh net that rolls down may be provided to provide additional security to items being stored on the shelf.

Other features and advantages of the instant invention will become apparent from the following description of the invention which refers to the accompanying drawings.

DETAILED DESCRIPTION OF THE INVENTION

Figure 1:
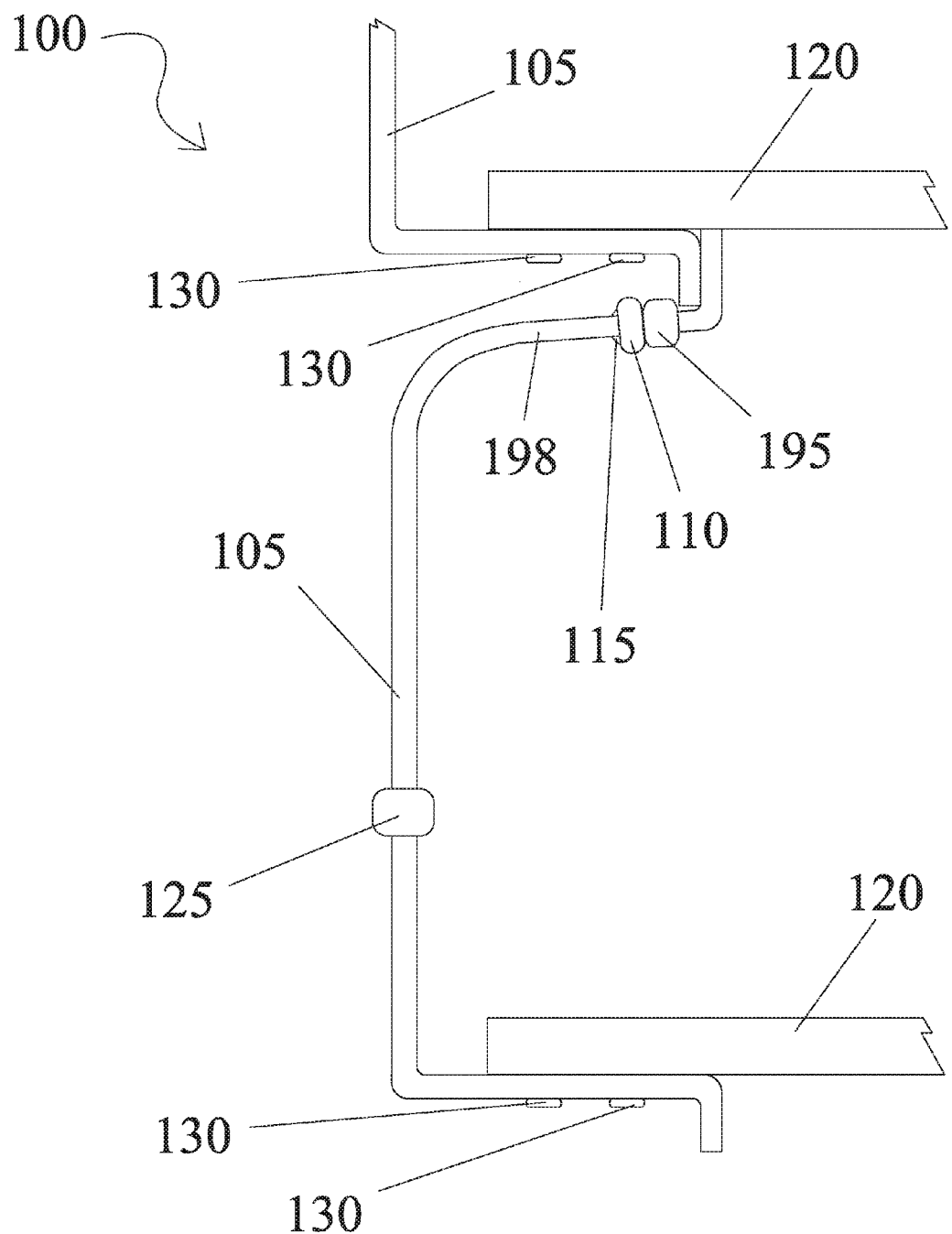
FIG. 1 is a side view of a guide rail of an earthquake-activated shelf security system according to an embodiment of the invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIGS. 1, 2 and 19A and 19B an earthquake-activated shelf security system 100 is shown having a pair of guide rails 105 that are located on either side of a shelf 120. A retainer 115 has a looped end 110 that is rotably held in place on each of its ends. As looped end 110 engages with guide rail 105, it is free to rotate as well as moving in and out as shown in position A and then to position B. Of course an infinite number of positions are available and the two positions shown are not meant to limit this disclosure. In the embodiment shown, looped end 110 fits within a hollow portion of retainer 115 which allows this movement. Of course other means of allowing movement are useable as long as the desired movement is achieved. Other means include, but not limited to, bushings, bearings, pistons, etc. as is known in the art. In the embodiment shown, the shank portion of looped end 110 is long enough so that even if one side of retainer 115 were at a different height than the other, looped ends 100 would not fall out. This length may be different depending on the height of the shelf protected by the instant invention.

Figure 2:
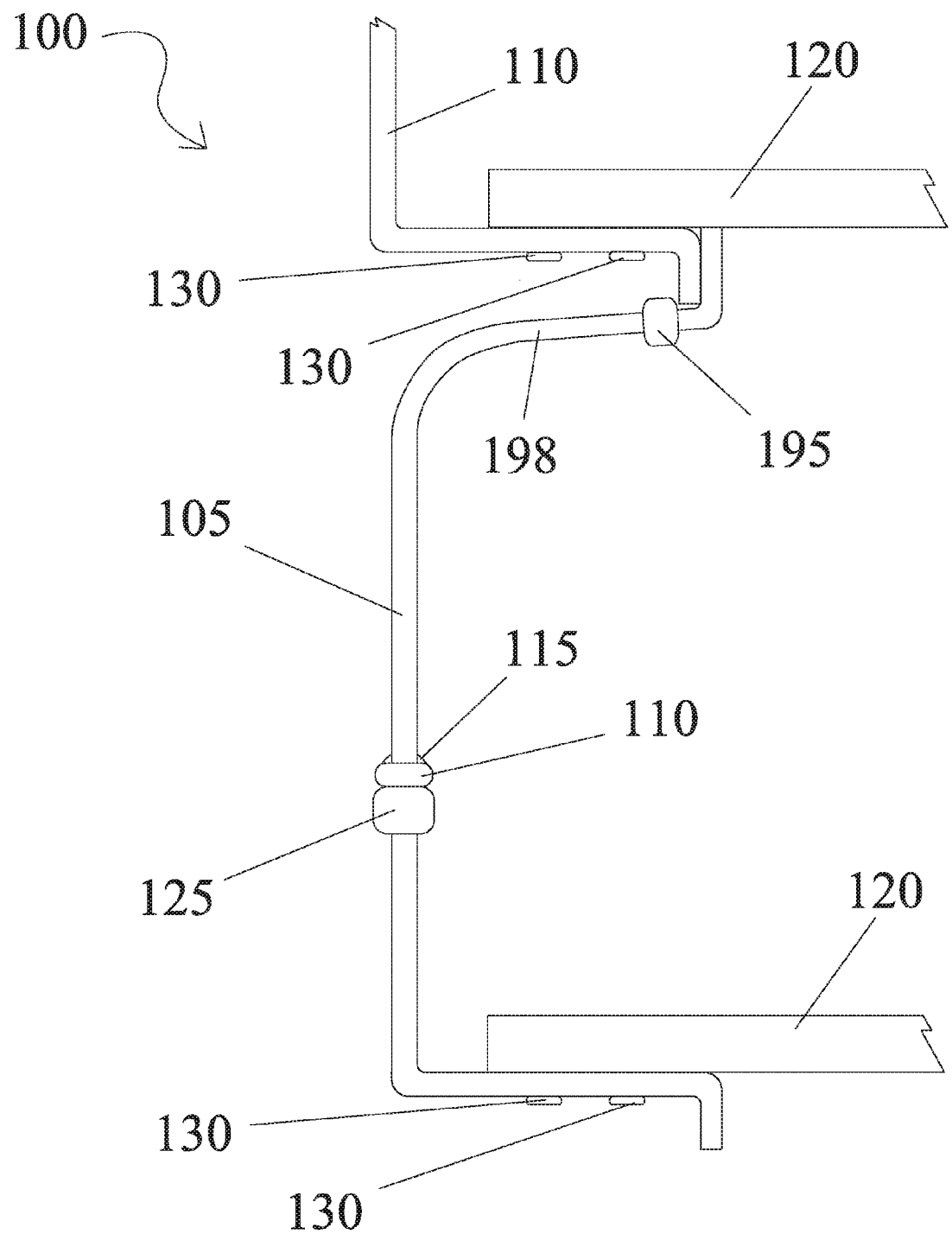
FIG. 2 is a side view of the guide rail shown in FIG. 1 in an activated configuration.

Now referring to FIGS. 1 and 2, a backstop 195 is provided to allow the user to adjust the sensitivity by sliding back and forth along a retainer rest portion 198. The further from the front backstop 195 is placed (position A), the more shaking required to activate it. Likewise, as backstop 195 is moved forward (position B), the less shaking is required to activate. Additionally, backstop 195 provides the user with a convenient way to reset after activation.

Again with reference to FIGS. 1 and 2, a retainer stop 125 is provided to limit the travel of retainer 115 as it moves along guide rail 105. Retainer stop 125 is user moveable by sliding up and down along guide rail 105. Retainer stop 125 is made of a compressible material like rubber or other material which frictional makes contact with guide rail 105 yet still allowing the user to move it to a selected position depending on what is being stored on shelf 120. Of course other retainer stops could be used such as using a set screw, pin or even permanently attached without departing from the instant invention.

Retainer rest portion is selected to be in the range of 1 degree to 10 degrees with a selected angle of 3 degrees from the horizontal working well in many environments. The steeper the angle, the more sensitive to shaking; however, if the angle is too great, the system may be accidentally activated. In the embodiment shown, fasteners 130 are used to secure guide rails 105 to shelf 120 as is known in the art. If desired, a top faster may be used to secure the upper portion of guide rail 105 to the lower portion of another guide rail 105. Additionally, a tab slot may be used to hold the upper portion without actually using a fastener. The tab slot is a channel that is shaped to hold the top portion of the guide rail.

As is shown in FIG. 2, retainer 115 is shown activated after an earthquake. Retainer 115 is now in place to prevent any items (not shown) stored on shelf 120 from falling.

Figure 3:
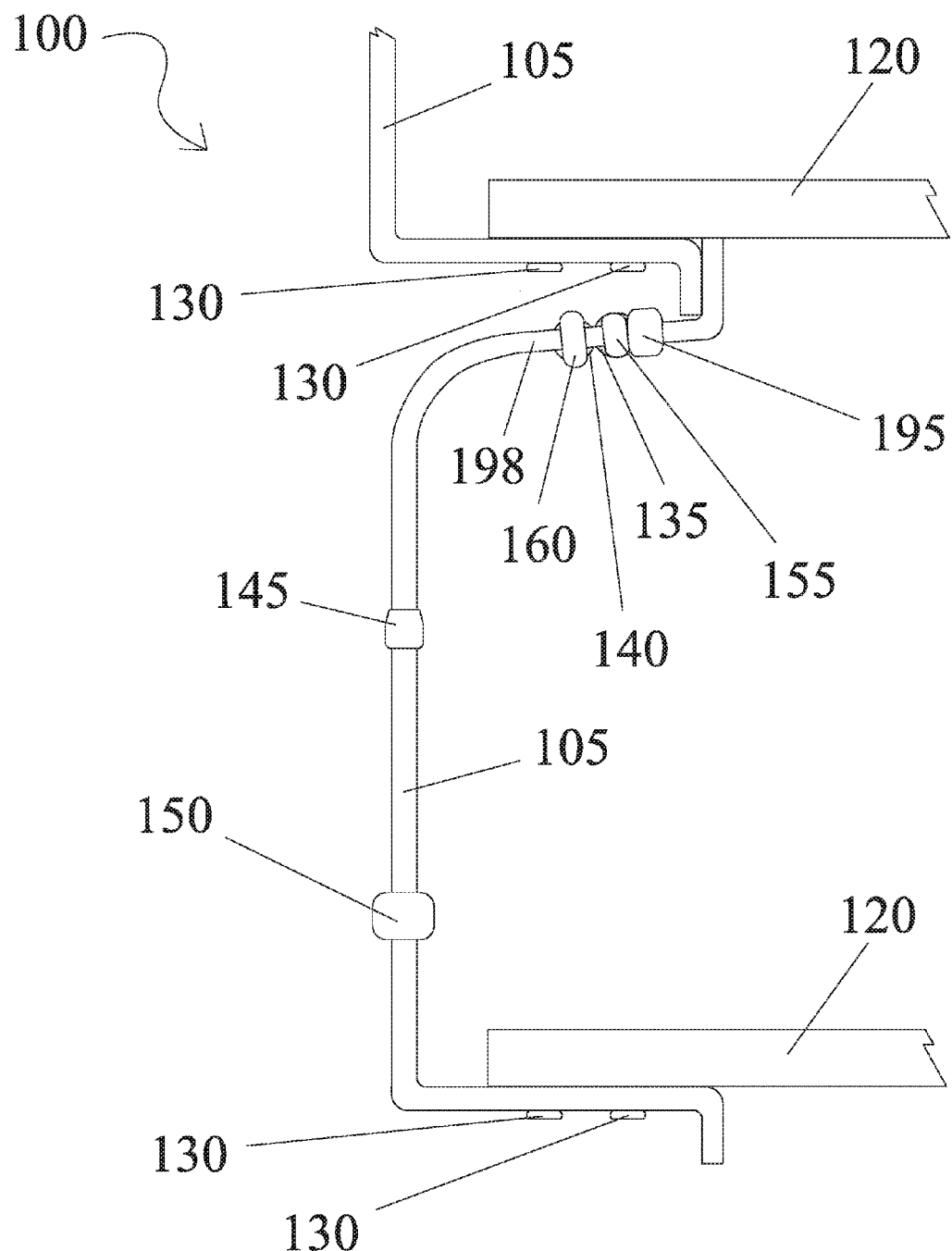
FIG. 3 is a side view of the guide rail shown in FIG. 1 with two retainers.
Figure 4:
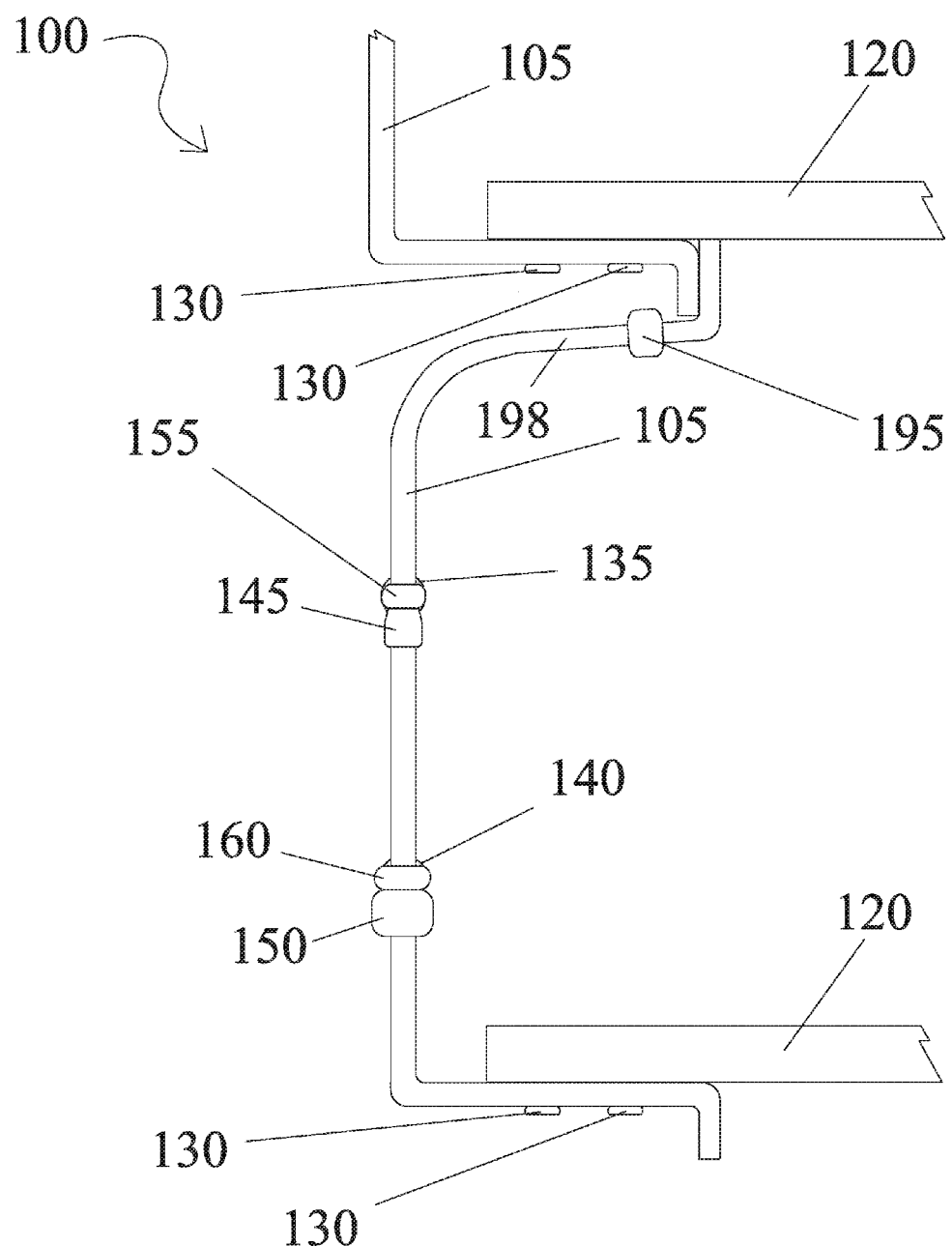
FIG. 4 is a side view of the guide rail shown in FIG. 3 in an activated configuration.

Now referring to FIGS. 3 and 4, earthquake-activated shelf security system 100 is shown having multiple retainers. An upper retainer 135 has an upper looped end 155 that rotates as discussed above. A lower retainer 140 has a lower looped end 160. Upper looped end 155 has a smaller diameter opening than lower looped end 160. Lower looped end 160 fits over upper retainer stop 145 and continues down guide rail 105 until it is stopped by a larger lower retainer stop 150. In this embodiment, two retainers are implemented to provide additional protection to items stored on shelf 120 such as bottles which could tip over or roll under a single retainer. After activation, the user simply pushes retainers 135 and 140 back up to retainer rest portion 98 against backstop 195 and it is ready for the next event.

Figure 5:
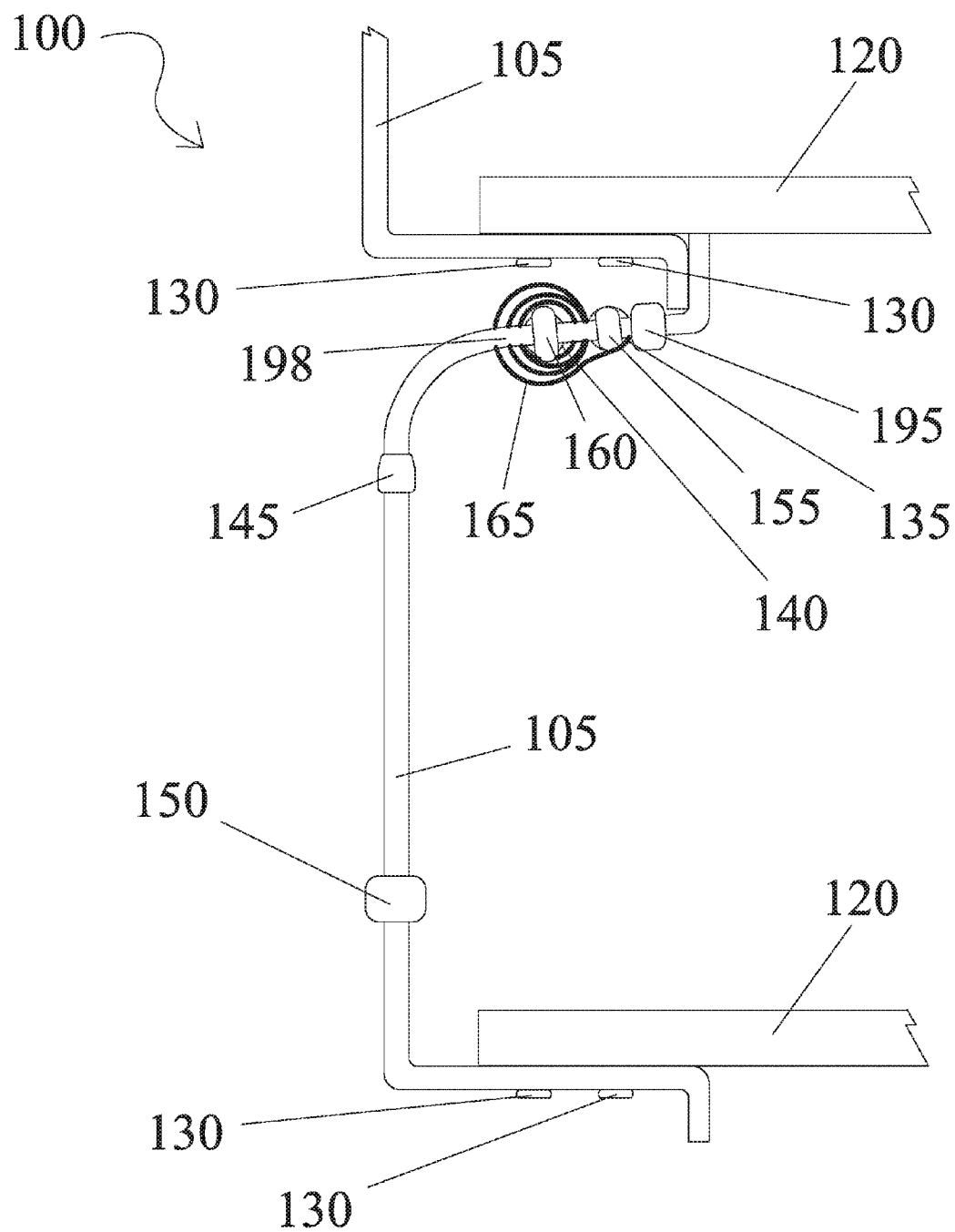
FIG. 5 is a side view of the guide rail shown in FIG. 1 with a mesh net.
Figure 6:
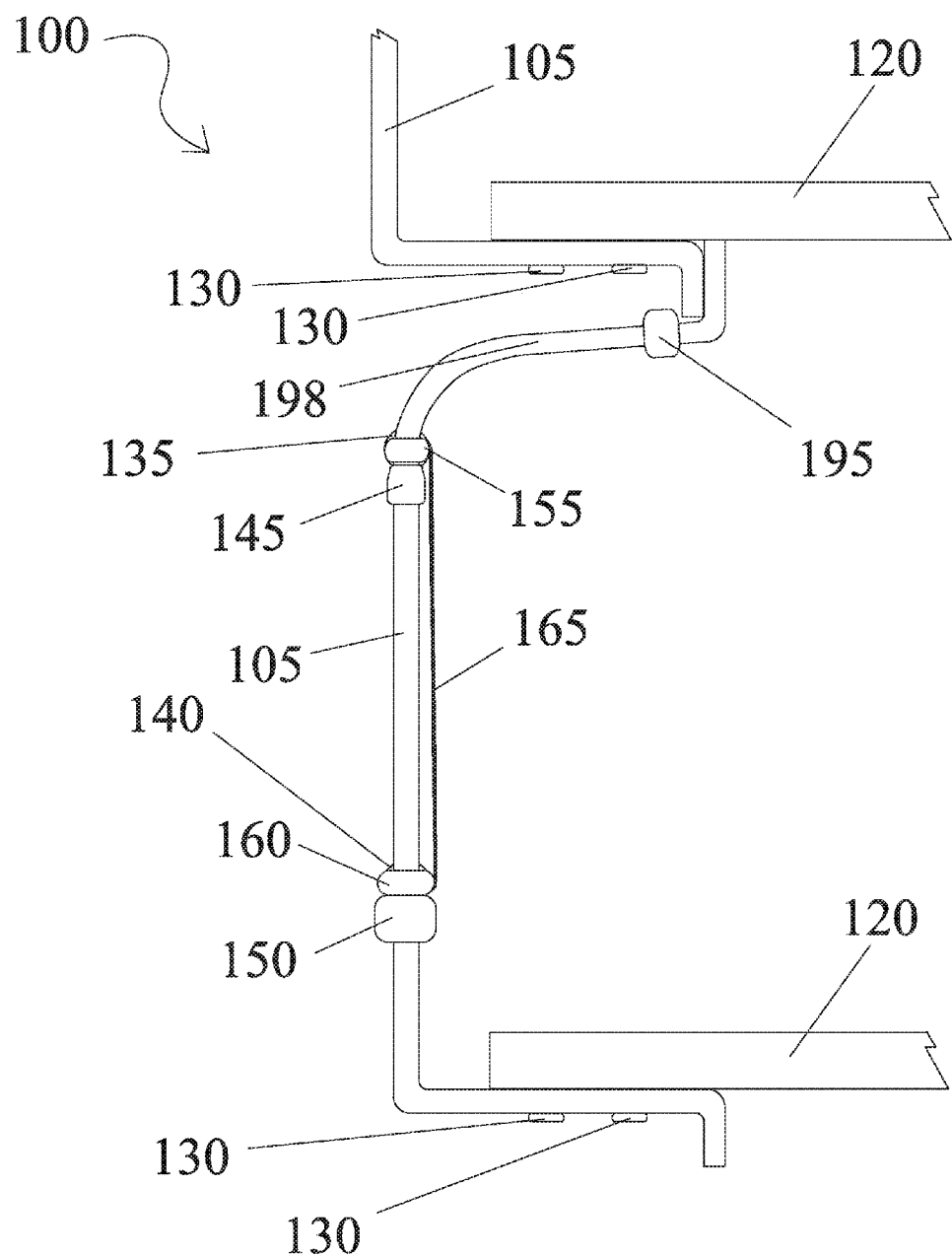
FIG. 6 is a side view of the guide rail shown in FIG. 5 in an activated configuration.

Referring now to FIGS. 5 and 6, a mesh net 165 is connected to upper retainer 135 and a lower retainer 140. Mesh net 165 is rolled around lower retainer 140 and then placed on retainer rest portion 198. During an event, mesh net 165 unrolls as upper retainer 135 is stopped by upper retainer stop 145 and lower retainer 140 continues down to lower retainer stop 150 and mesh net 165 is then in place to protect objects that would fall through if only the retainers were used. After activation, the user rolls mesh net 165 back up and placed back in retainer rest portion 198. Mesh net 165 is made of a netting material such as nylon or other suitable material. Of course mesh net 165 could also be a solid plastic or cloth sheet as long as it is flexible enough to roll up.

Figure 7A:
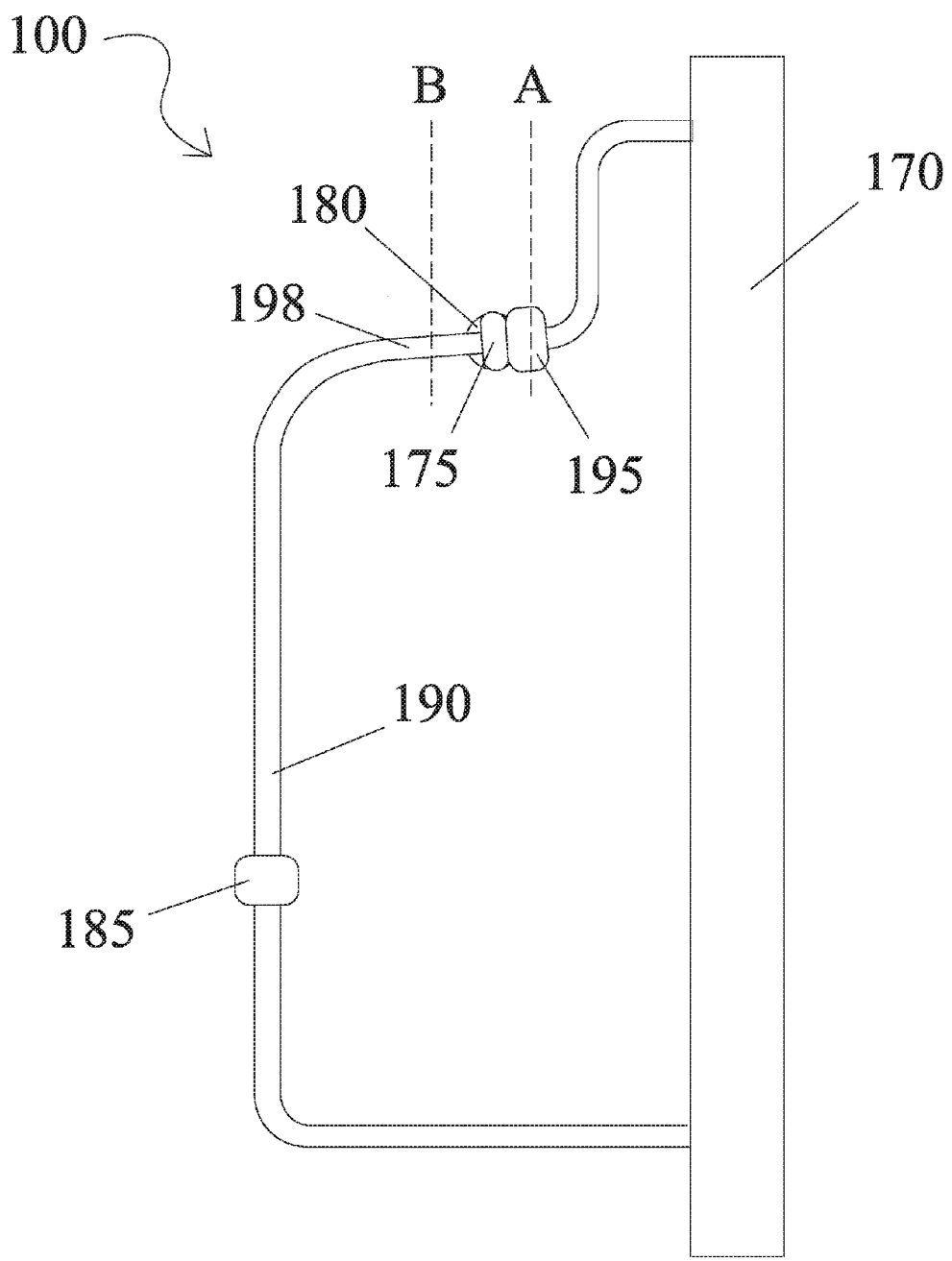
FIG. 7A is a side view of the guide rail shown in figure one in a less sensitive selected initial position.
Figure 7B:
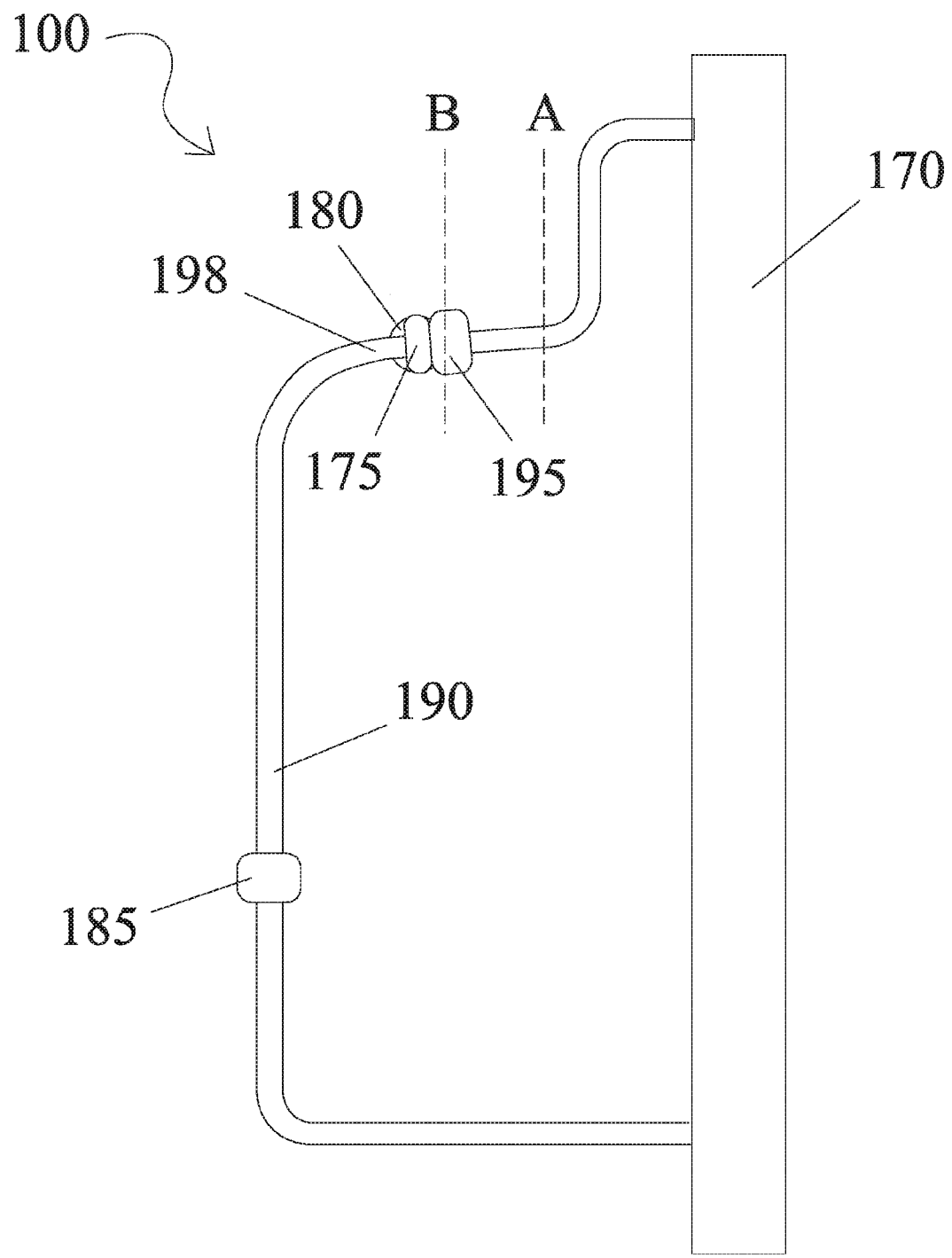
FIG. 7B is a side view of the guide rail shown in figure one in a more sensitive selected initial position.

Referring to FIGS. 7A and 7B, another embodiment of earthquake-activated shelf security system 100 is shown having a shelving unit 170 with a guide rail 190 mounted on shelving unit 170. As discussed above, backstop 195 is provided to allow the user to adjust the sensitivity by sliding back and forth along retainer rest portion 198. A retainer 175 has a looped end 180 that is rotably held in place on each of its ends. As looped end 180 engages with guide rail 190, it is free to rotate as well as moving in and out as shown in position A and then to position B.

Figure 8:
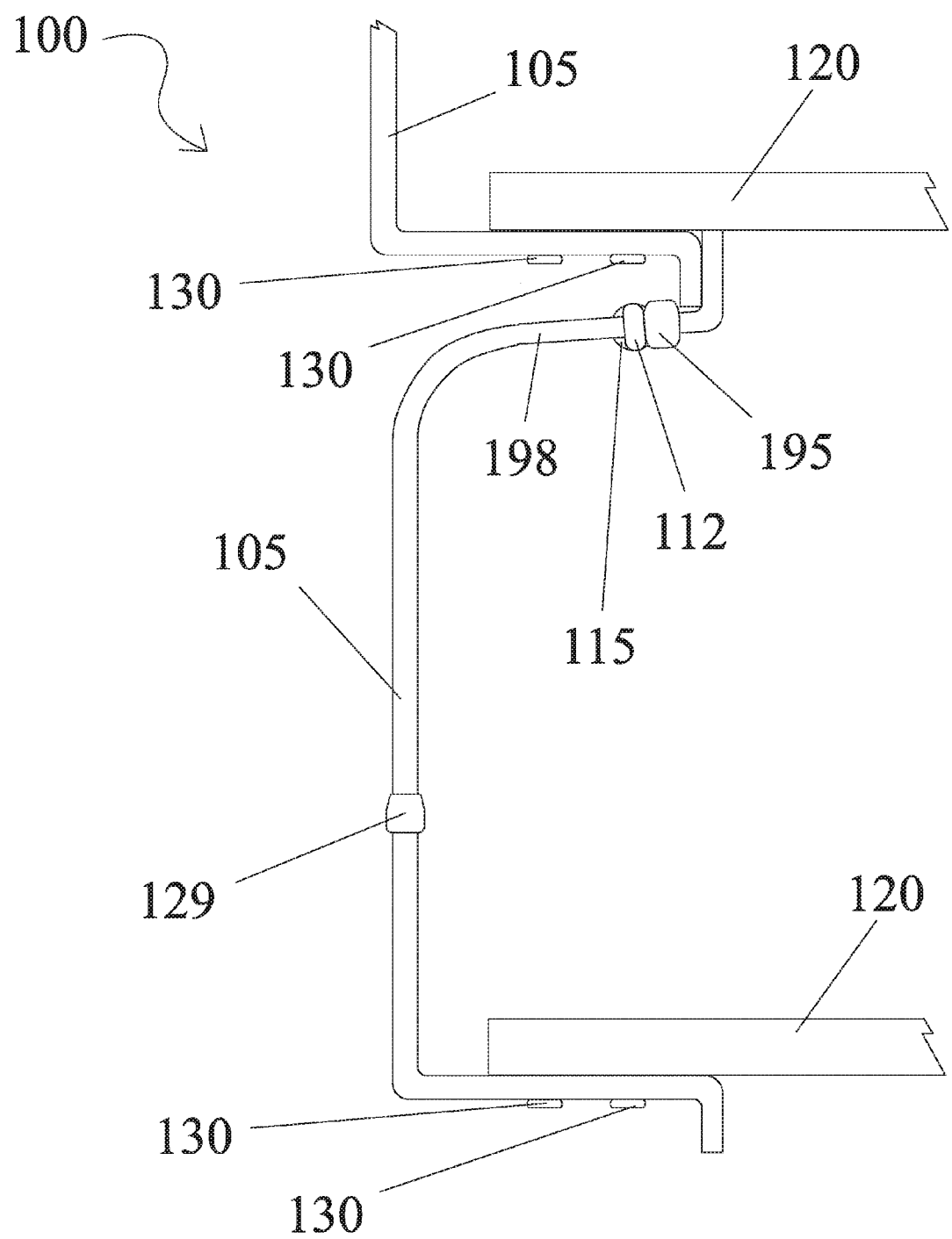
FIG. 8 is a side view of the guide rail shown in figure one having a smaller retainer stop.

Now referring to FIG. 8, earthquake-activated shelf security system 100 is shown having a small retainer stop 129 that is used to increase the esthetic appeal. Retainer 115 uses a small looped end 112 to interact with small retainer stop 129 which allows a user to work with the items stored on shelf 120 while minimizing any distraction caused by the system n other ways, this embodiment is like the ones discussed above.

Figure 9:
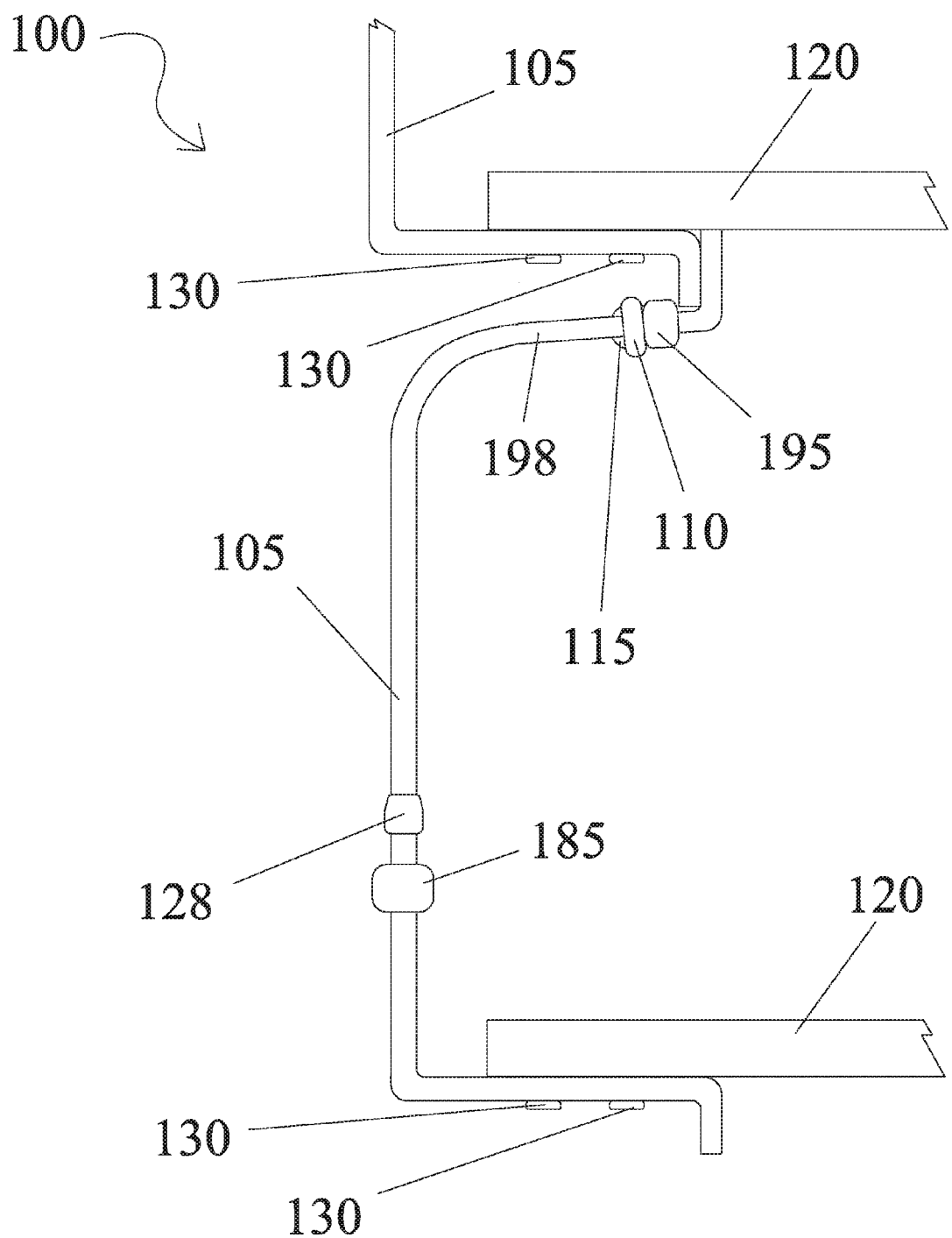
FIG. 9 is a side view of the guide rail shown in figure one having an additional retainer stop.
Figure 10:
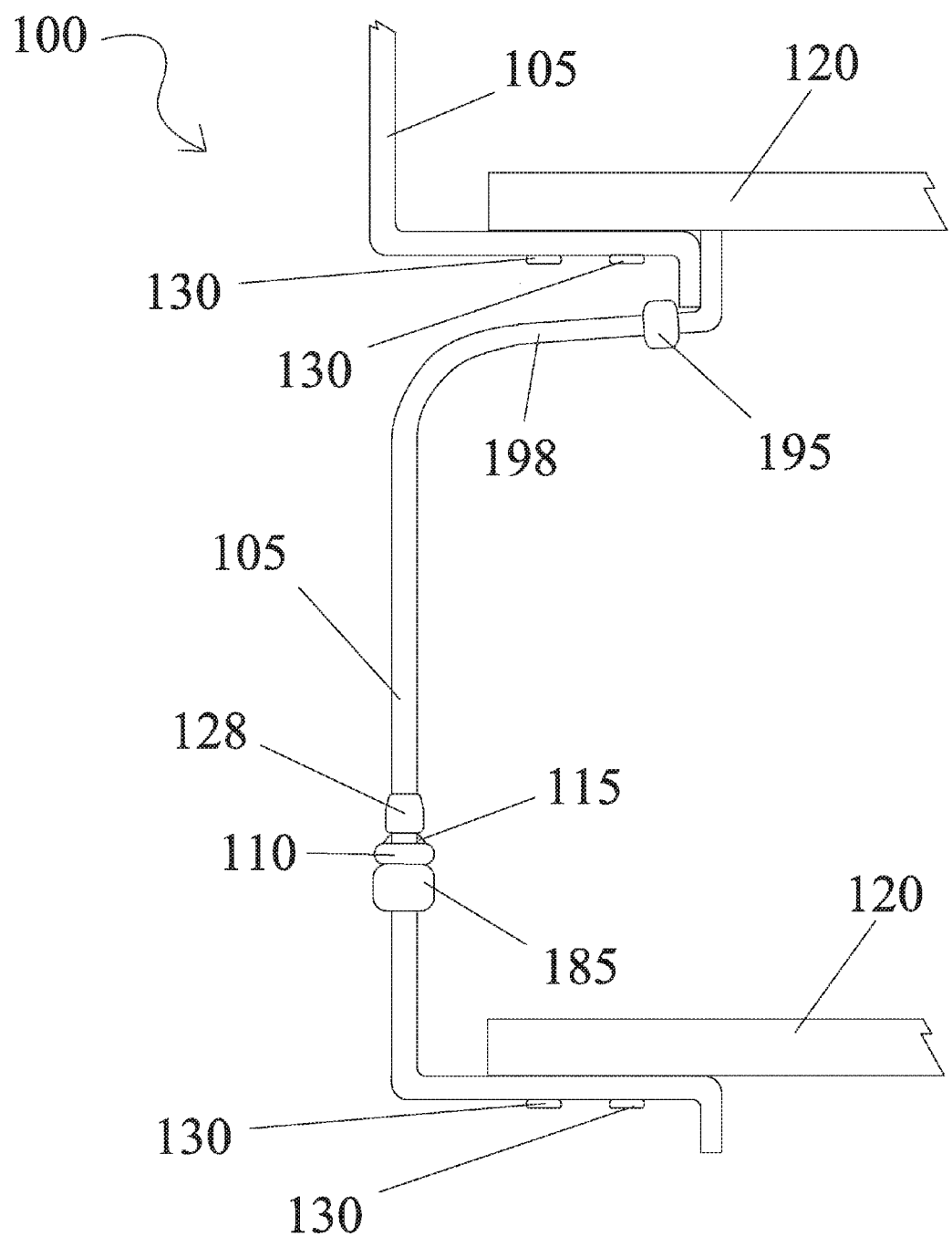
FIG. 10 is a side view of the guide rail shown in FIG. 9 in an activated configuration.

Referring now to FIGS. 9 and 10, earthquake-activated shelf security system 100 is shown having an extra retainer stop 128 disposed close to a larger retainer stop 185. Extra retainer stop 128 is tapered so that its upper portion has a smaller diameter than its bottom portion thus trapping looped end 110 between extra retainer stop 128 and retainer stop 185 until reset. Retainer stop 185 stops retainer 115 from falling any further when activated and extra retainer stop 128 is used to further stabilize retainer 115 when activated thus preventing retainer 115 from being pushed upward when items from shelf slide into lower retainer 140 or mesh net 165 (FIG. 5). Again, except as discussed above, this embodiment performs like the embodiments shown in FIGS. 1-6.

Figure 11:
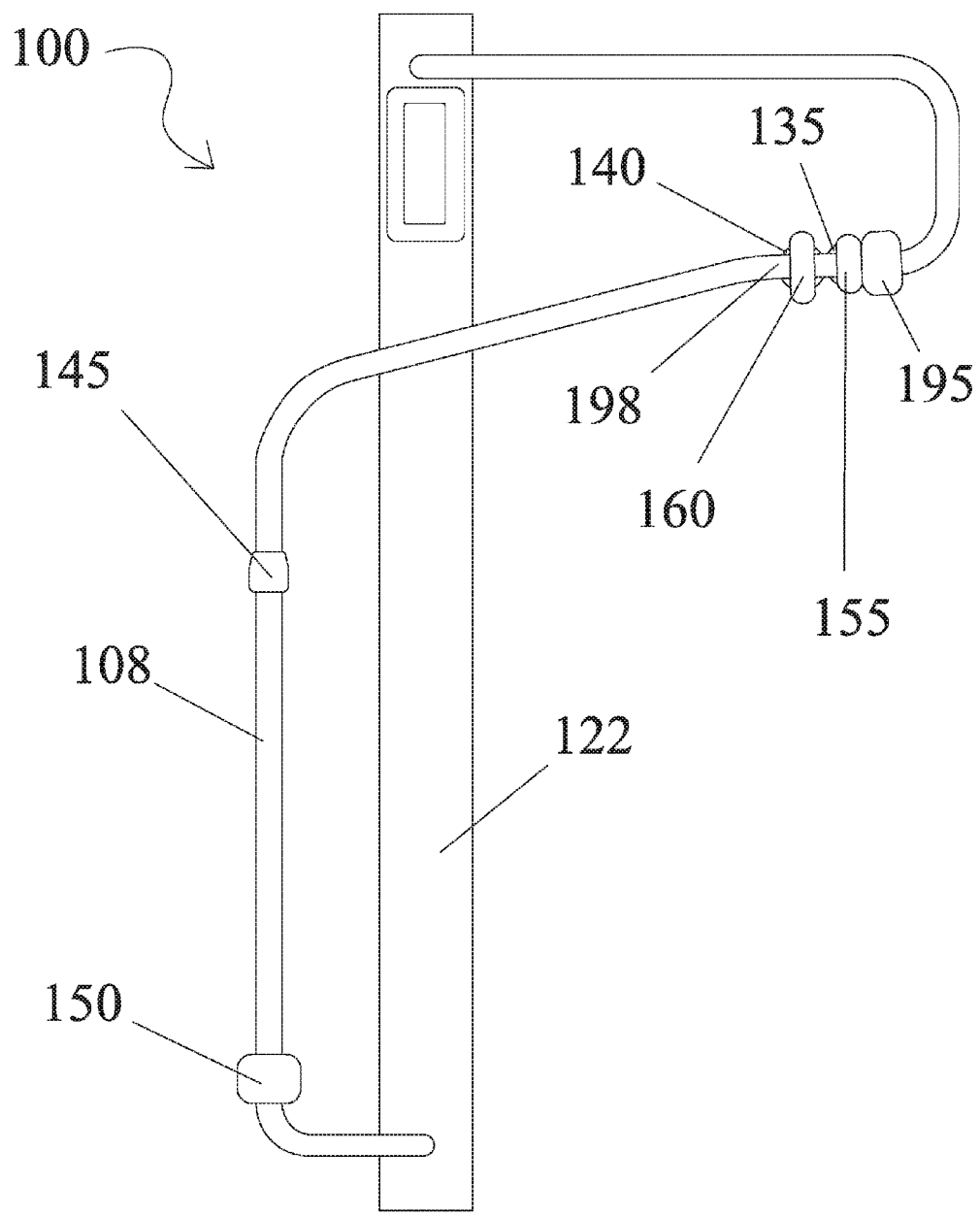
FIG. 11 is a side view of a guide rail of an earthquake-activated shelf security system according to an embodiment of the invention.
Figure 12:
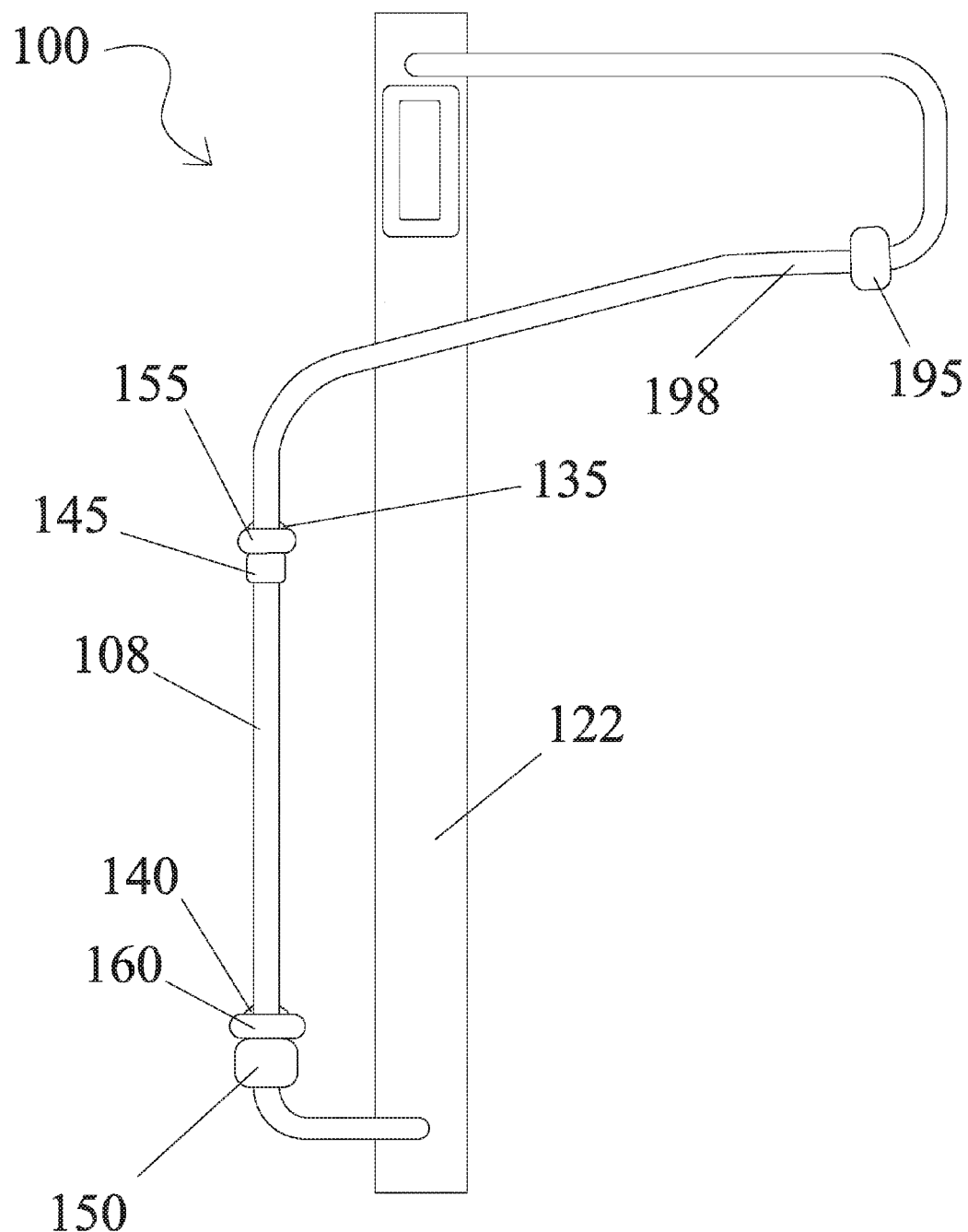
FIG. 12 is a side view of the guide rail shown in FIG. 11 in an activated configuration.

Now referring to FIGS. 11 and 12, earthquake-activated shelf security system 100 is shown mounted on an inside portion of shelf 122 to minimize the intrusiveness of the system by only having a small portion of a guide rail 108 showing and retainer rest portion 198 being placed out of the way. An intermediate portion of guide rail 108 is used to allow this configuration with retainer rest portion 198 using the ideal angle that allows retainers 135 and 140 to continue falling into place once activated by an earthquake.

Figure 13:
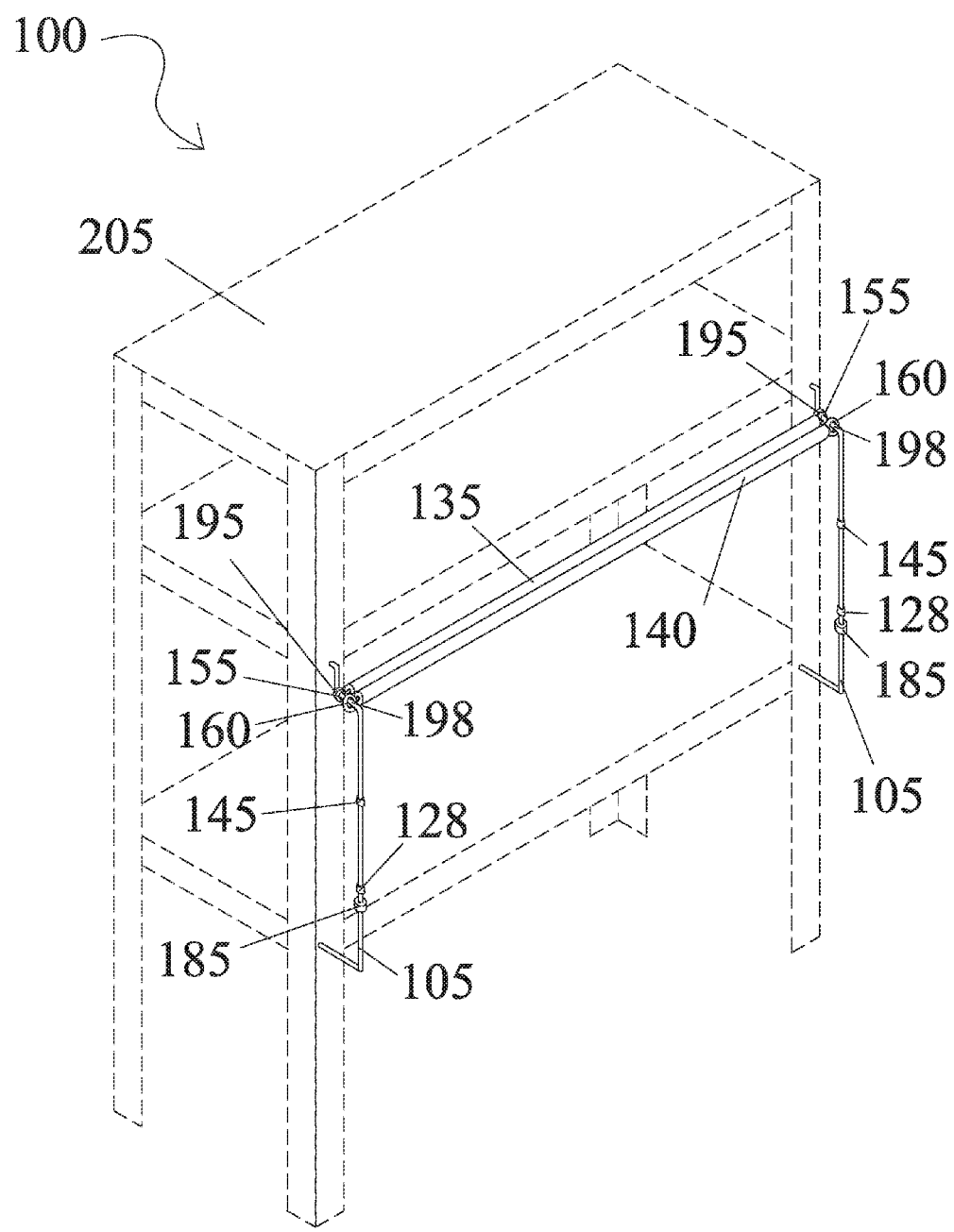
FIG. 13 is a perspective view of a shelf unit having an earthquake-activated security system installed according to an embodiment of the invention.
Figure 14:
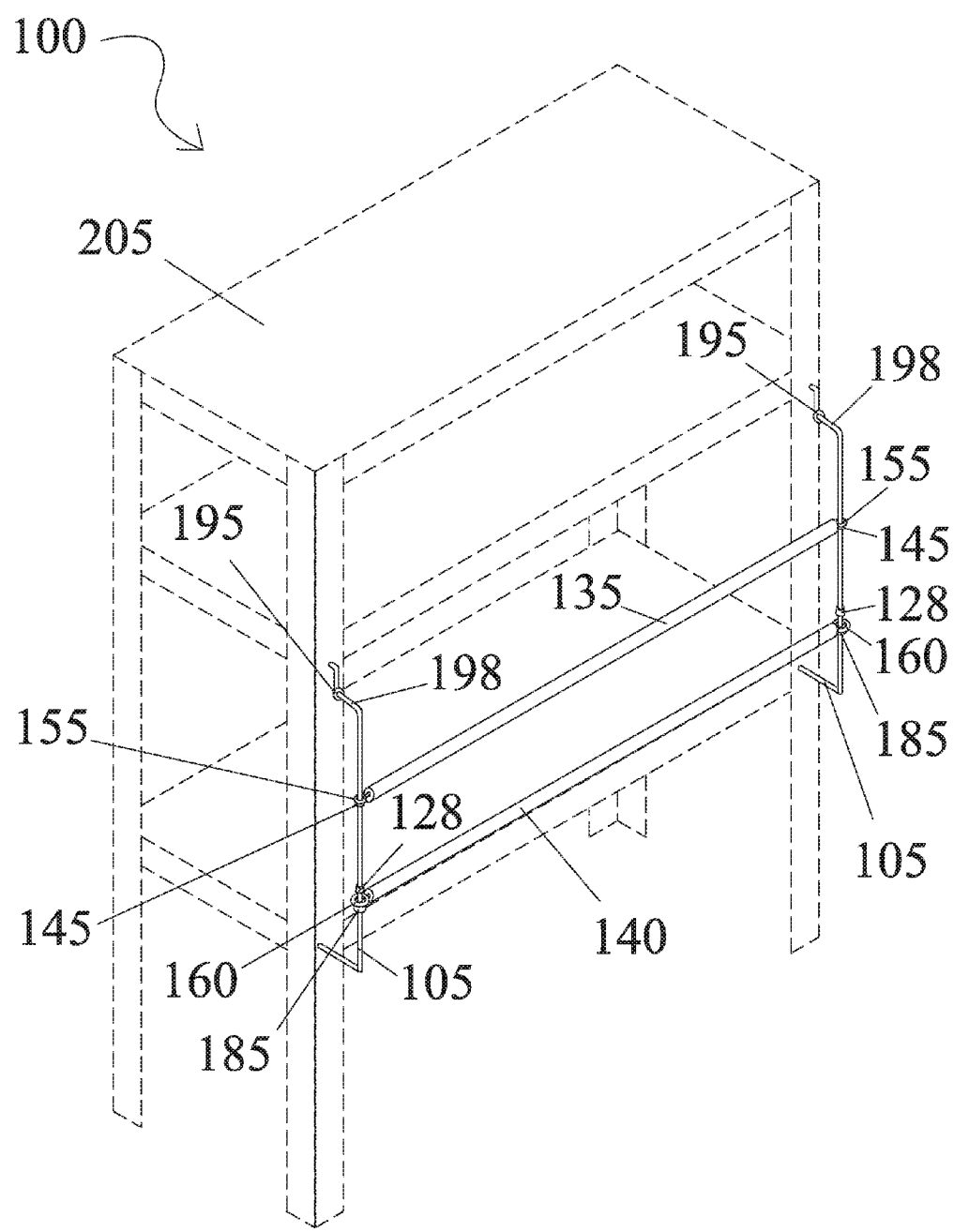
FIG. 14 is a perspective view of the shelf unit having an earthquake-activated security system shown in FIG. 13 in an activated configuration.

In FIGS. 13 and 14, earthquake-activated shelf security system 100 is shown attached to a shelf unit 205. Although for simplicity, the system is only shown attached to one shelf, it is understood that the system can be placed on each and every shelf. In FIG. 13, the system is prepped by placing retainers 135 and 140 in retainer rest portion 198. In an earthquake, shelf unit 205 may shake in any direction which will immediately cause retainers 135 and 140 respectively to fall along guide rails 105. Lower retainer 140 falls past upper retainer stop 145 and is stopped by lower retainer stop 185 while upper retainer 135 is stopped by upper retainer stop 145. As discussed above extra retainer stop 128 is used to provide extra stability by preventing lower retainer 140 from simply sliding back up guide rail 105.

Figure 15:
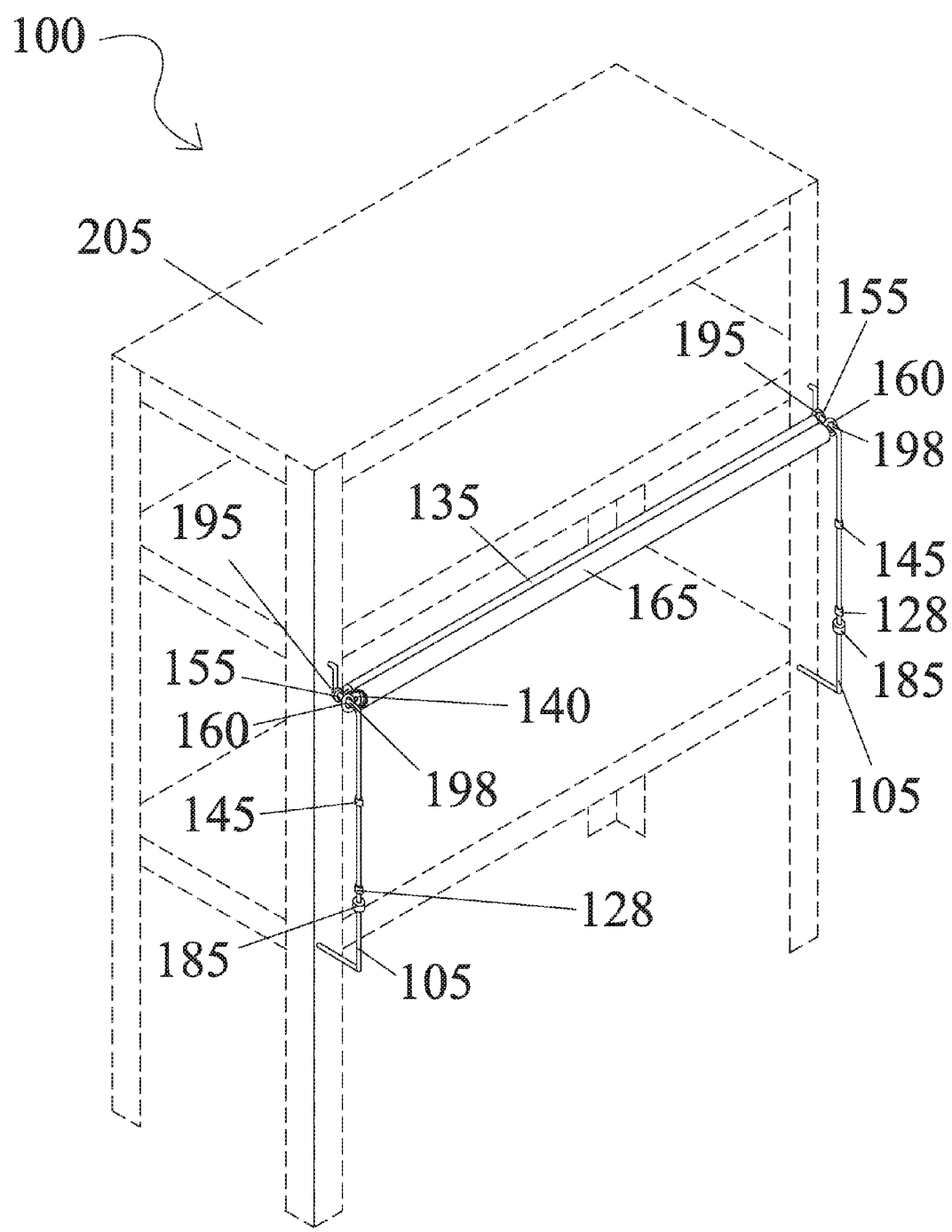
FIG. 15 is a perspective view of a shelf unit having an earthquake-activated security system with a mesh net installed according to an embodiment of the invention.
Figure 16:
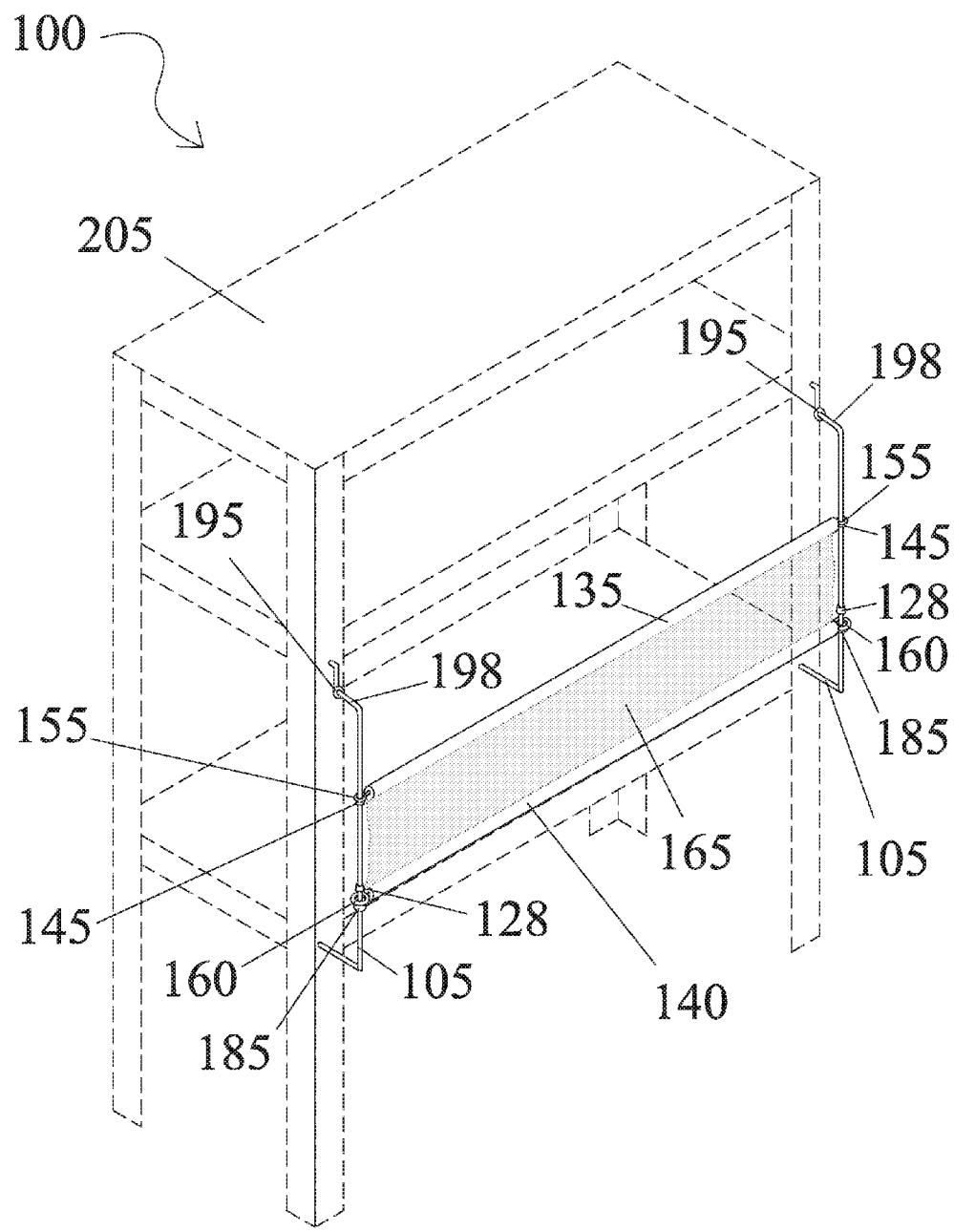
FIG. 16 is a perspective view of the shelf unit having an earthquake-activated security system shown in FIG. 15 in an activated configuration.

Referring to FIGS. 15 and 16, earthquake-activated shelf security system 100 is shown using mesh net 165 which is attached between upper retainer 155 and lower retainer 185. As discussed above, mesh net 165 is used when additional protection is needed. As discussed above extra retainer stop 128 is used to provide extra stability by preventing lower retainer 140 from simply sliding back up guide rail 105.

Figure 17:
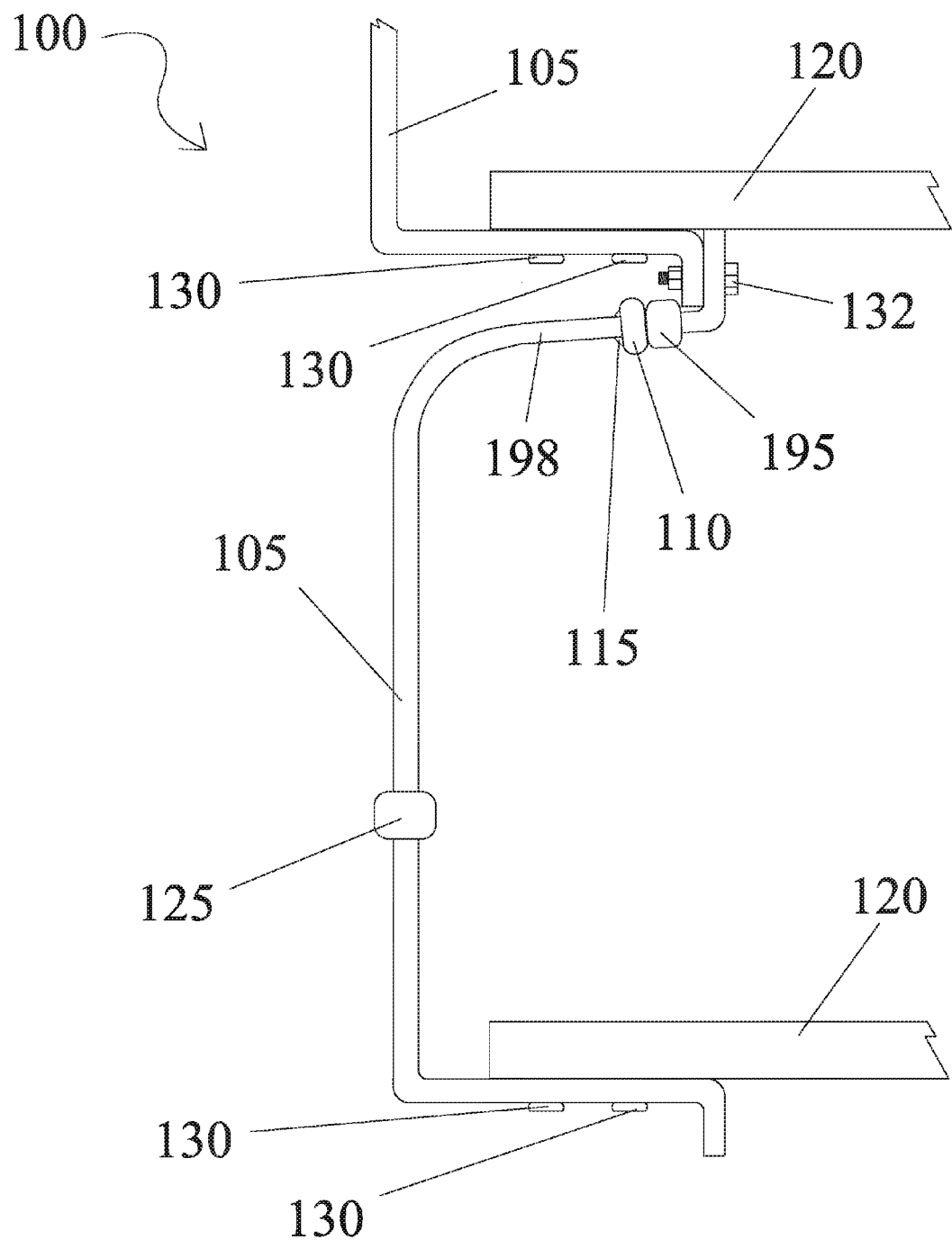
FIG. 17 is a side view of the guide rail shown in FIG. 1 attached to another guide rail using a bolt.
Figure 18:
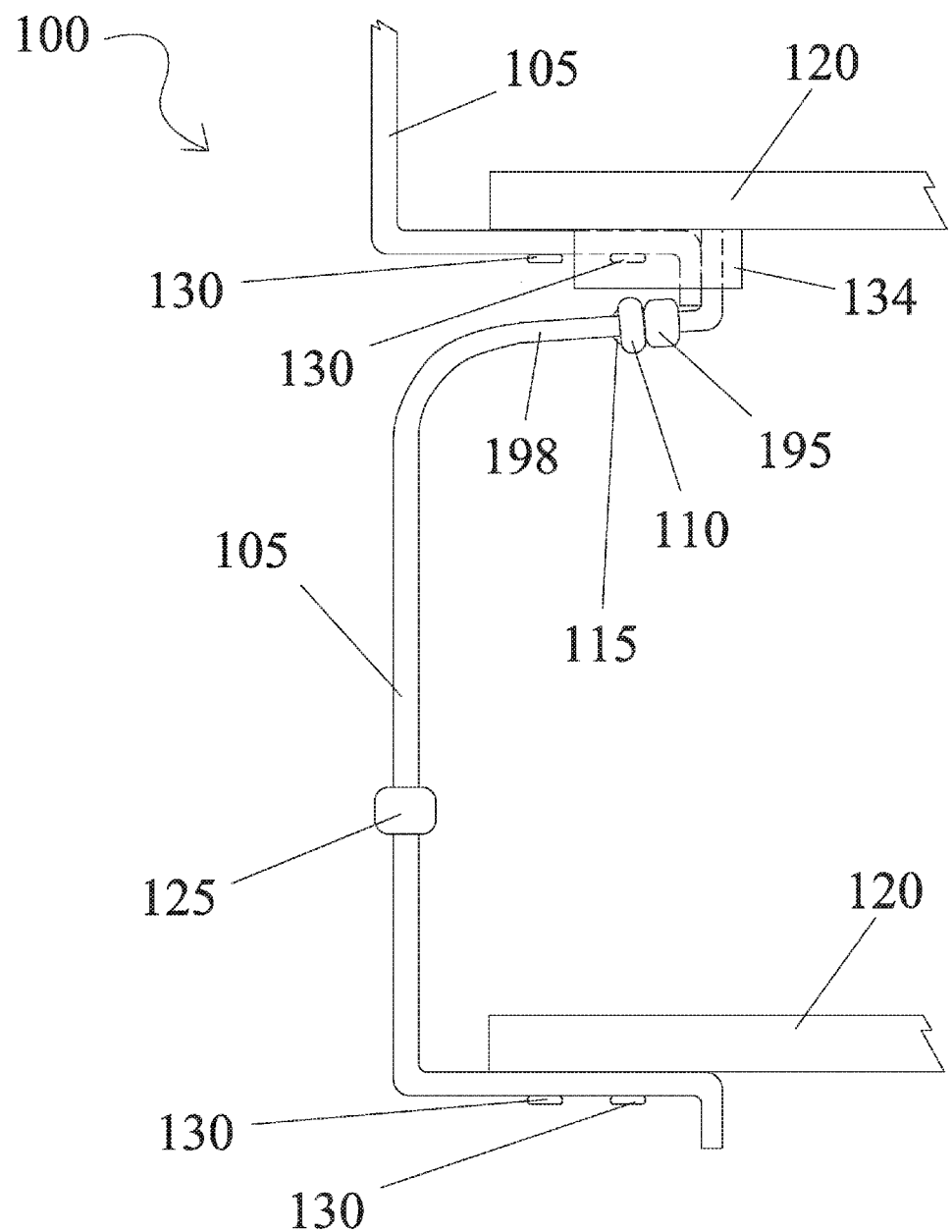
FIG. 18 is a side view of the guide rail shown in FIG. 1 attached to another guide rail using a channel bracket.
Figure 19A:
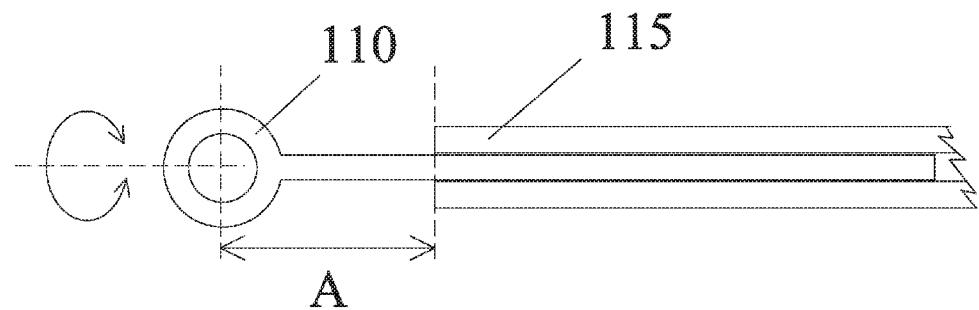
FIG. 19A is a detailed side view of the retainer in a selected position.
Figure 19B:
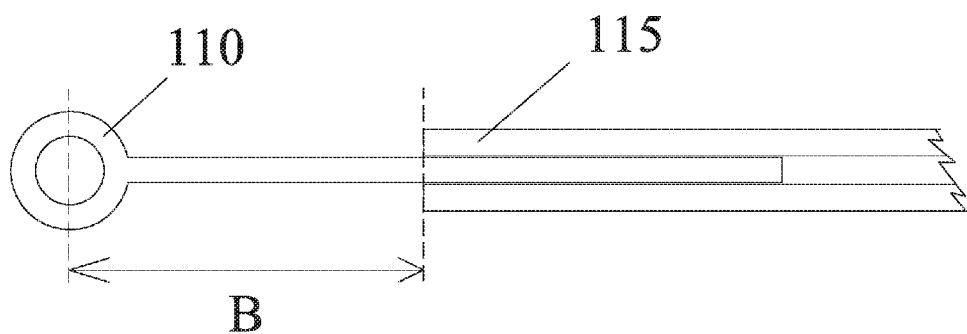
FIG. 19B is a detailed side view of the retainer in a second selected position.

Referring now to FIGS. 17 and 18, guide rails 105 are attached to another guide rail 105 using a bolt 132 (FIG. 17) or a channel bracket 134 (FIG. 18) attached to shelf 120. Of course other fastening methods may be used as long as guide rails 105 are securely held in place.

The distance between guide rails 105 and shelves 120 may be adjusted by providing slots in the portion of guide rails 105 that attach to shelves 120. Other methods of adjusting the distance may be used including mounting adjusting brackets (not shown) or other acceptable adjusting means as is known in the art.

The guide rails used in this invention are generally round metal bars but could be made of other suitable materials including, but not limited to, plastic, composites, wood, etc. Again, although round stock are used, other shapes would be usable such as hexagonal, oval or even square stock as long as the looped ends can travel down the guide rails smoothly and reliably.

Figure 20:
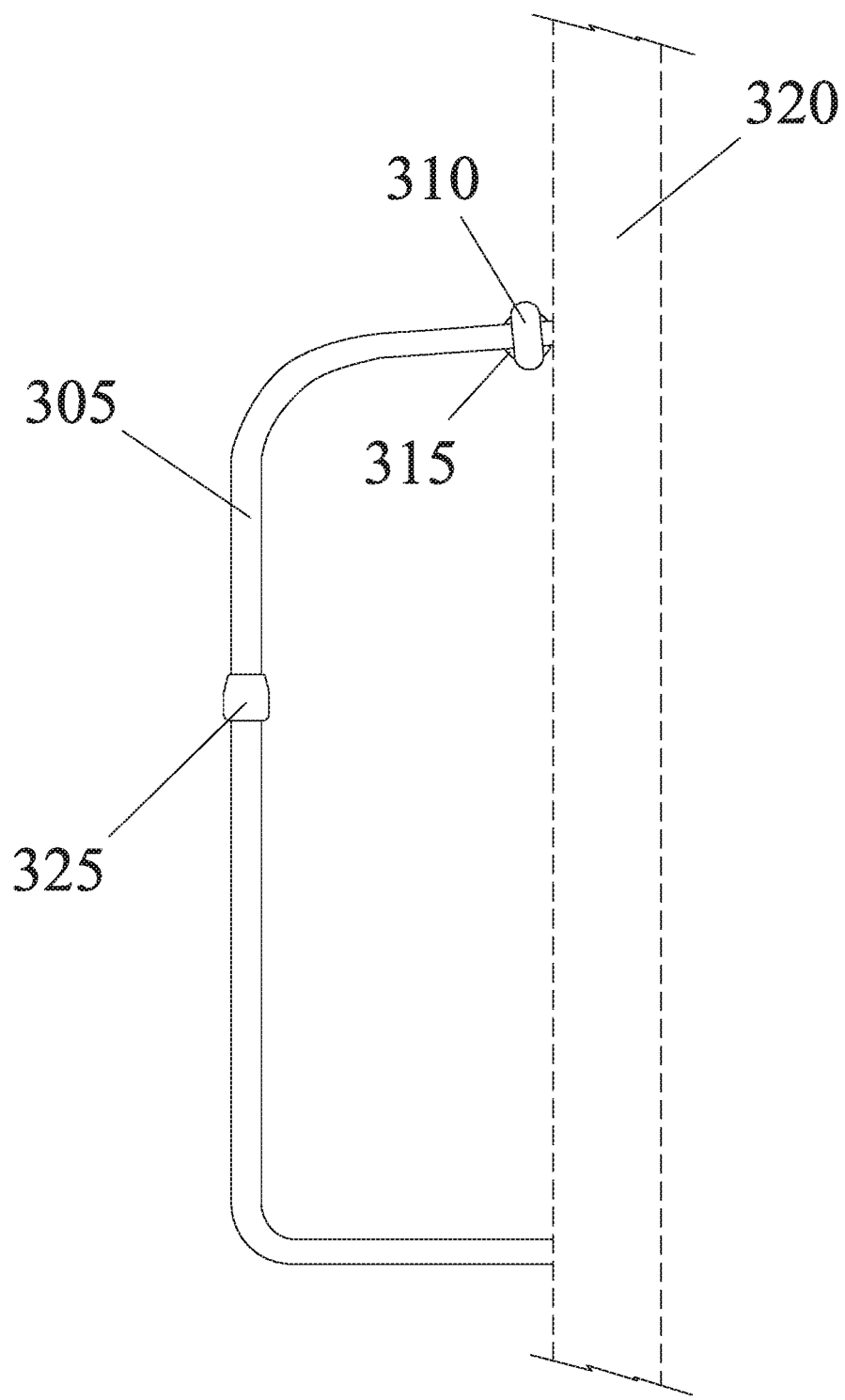
FIG. 20 is a side view of an earthquake-activated shelf security system according to an embodiment of the present invention.
Figure 21:
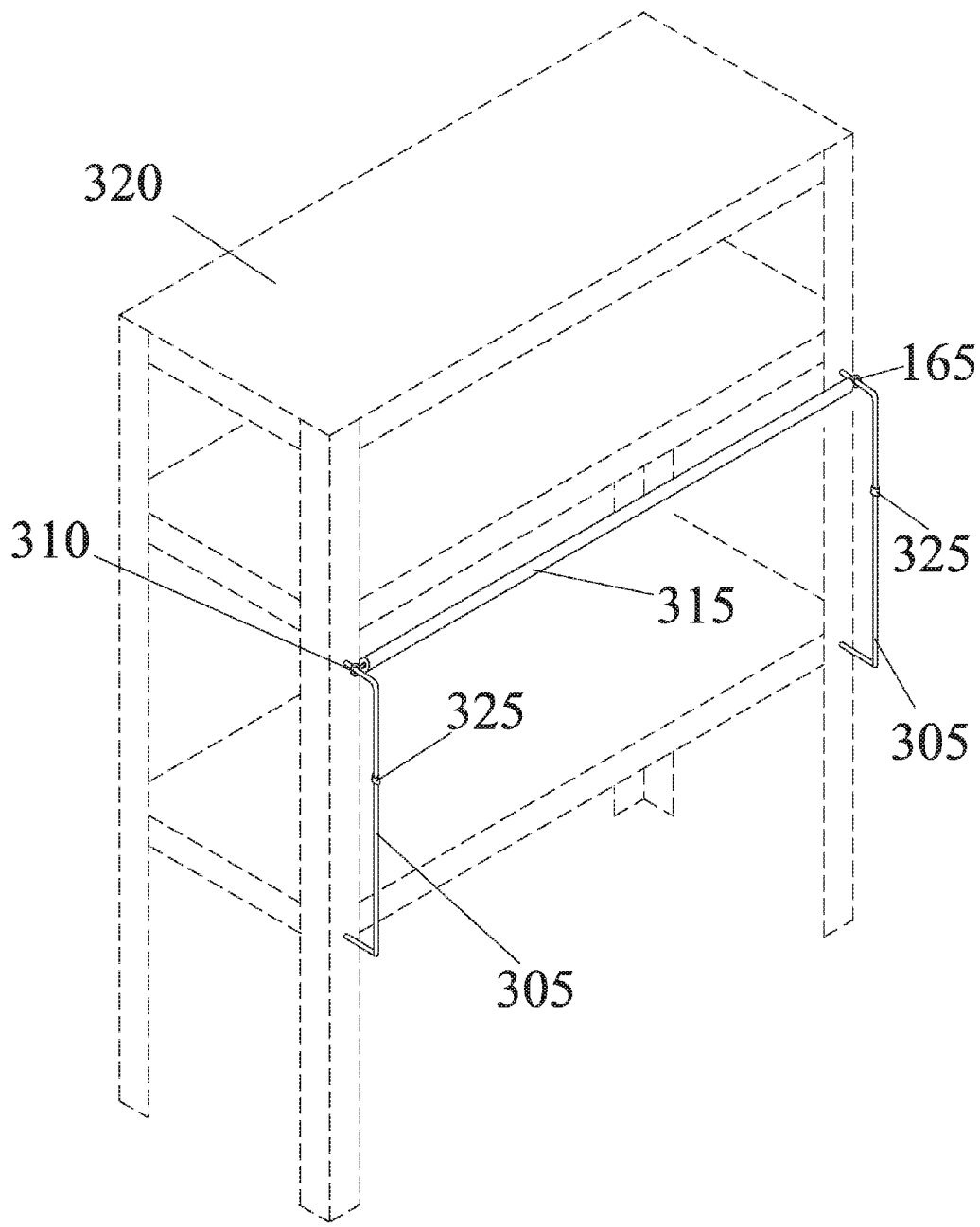
FIG. 21 is a perspective view of the earthquake-activated shelf security system shown in FIG. 20 installed on a shelf unit.

Now referring to FIGS. 20 and 21, an earthquake-activated shelf security system has a pair of guide rails 305 mounted to a shelf unit 320. A movable retainer 315 has looped ends 310 that rotate and travel along guide rails 305 as discussed above. A retainer stop 325 is used to stop retainer 315 and position it in a desired position where the contents of a shelf are prevented from falling. Retainer stops 325 may be placed at different locations to accommodate various sized shelves and contents being secured. Retainer stops 325 may be frictionally adjustable or may use a mechanical fastener to allow for adjustment.

Figure 22:
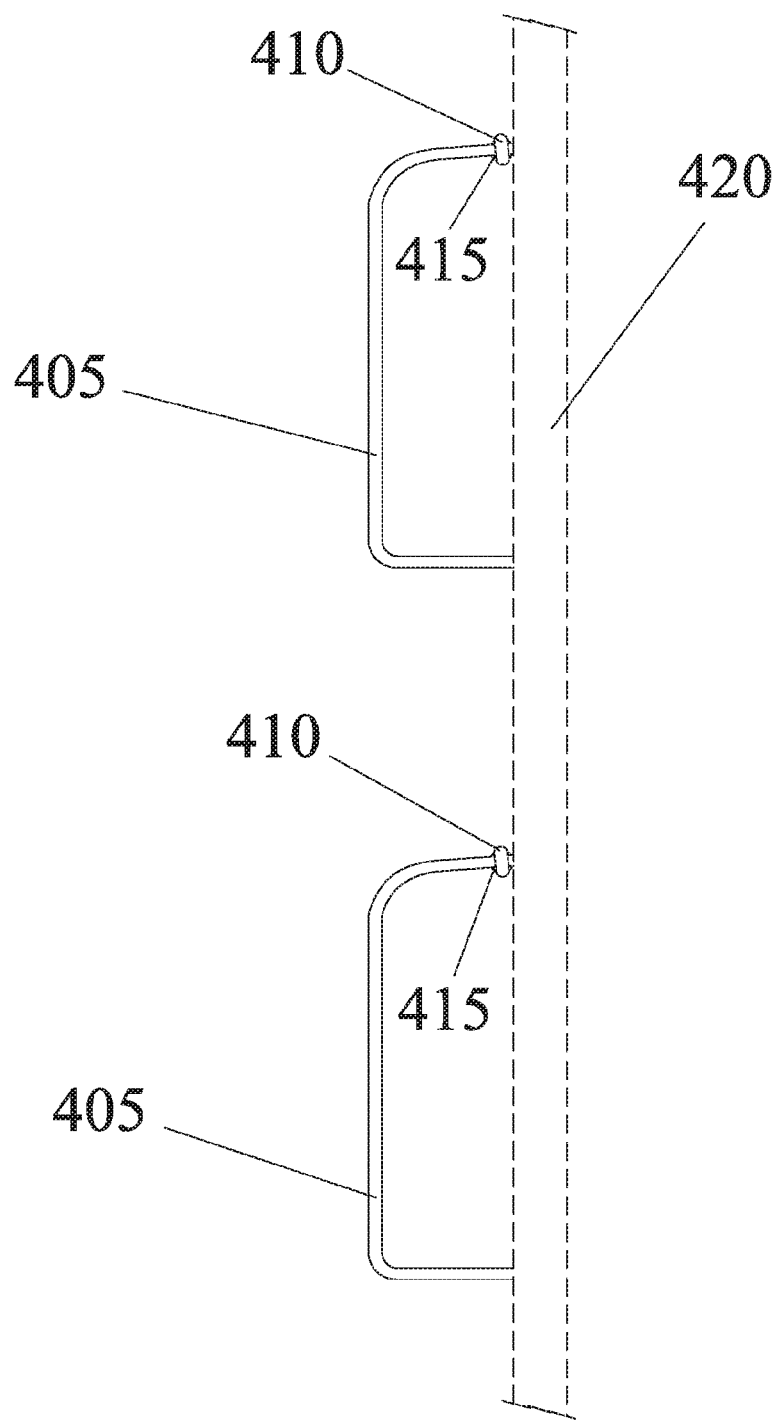
FIG. 22 is a side view of an earthquake-activated shelf security system according to another embodiment of the present invention.
Figure 23:
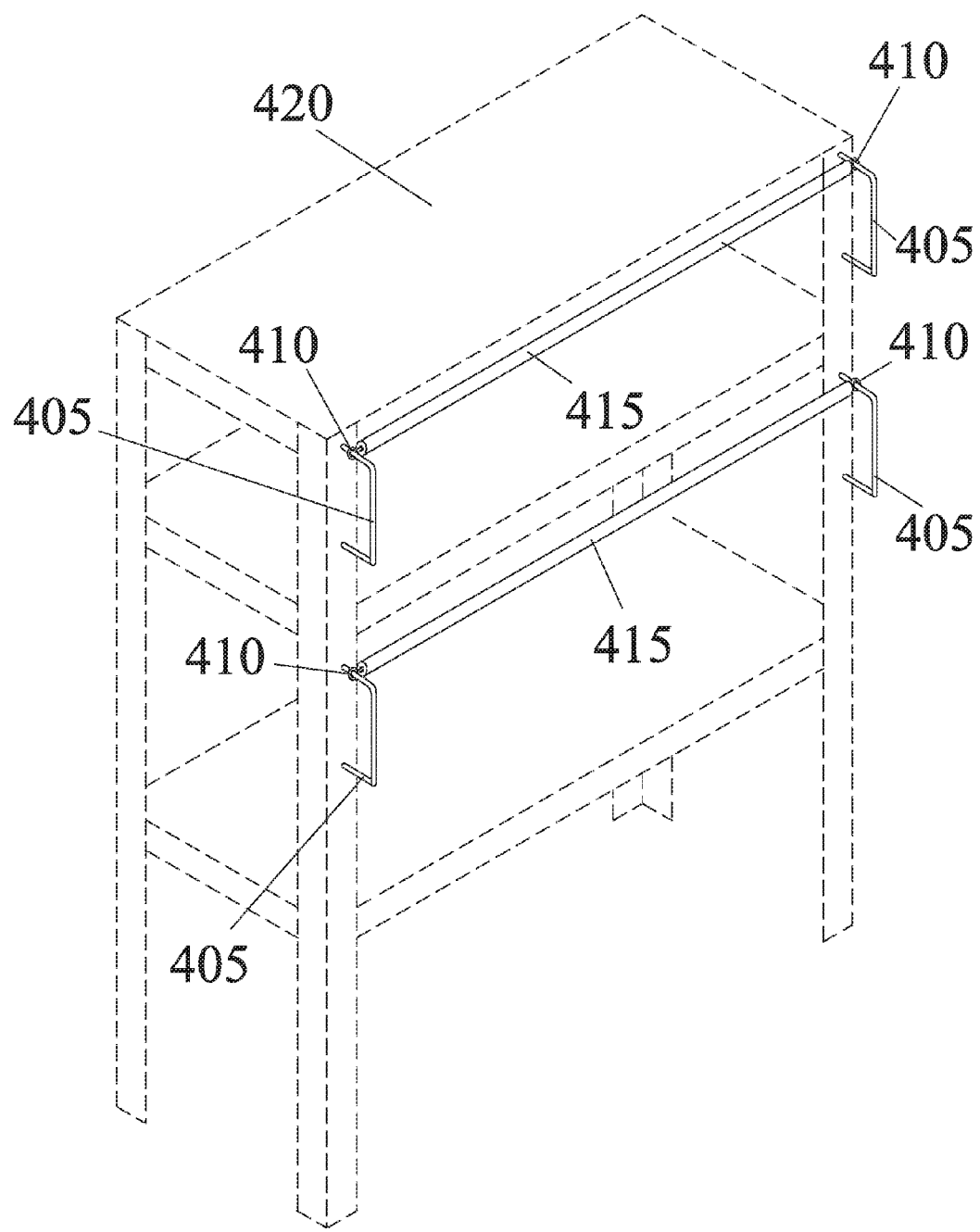
FIG. 23 is a perspective view of the earthquake-activated shelf security system shown in FIG. 22 installed on a shelf unit.

Referring now to FIGS. 22 and 23, an earthquake-activated shelf security system has a pair of guide rails 405 mounted to a shelf unit 420. A movable retainer 415 has looped ends 410 that rotate and travel along guide rails 405 as discussed above. In this embodiment, no retainer stop is used since guide rail 405 is mounted in a position that only permits retainer to move along the bottom of guide rails 405, thus eliminating the need for a retainer stop.

Figure 24:
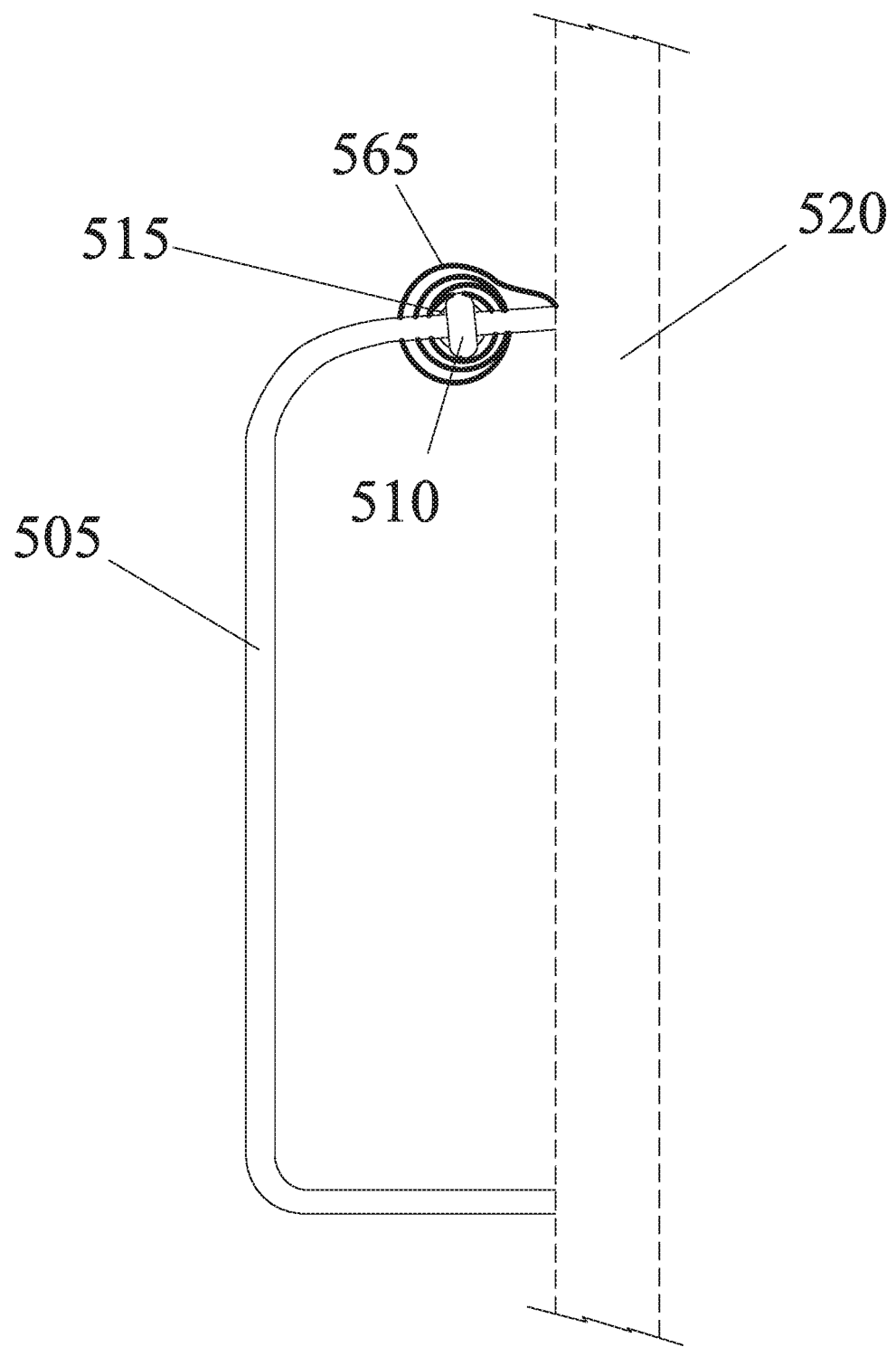
FIG. 24 is a side view of an earthquake-activated shelf security system according to another embodiment of the present invention having a mesh net and no retainer stop.

Referring to FIG. 24, an earthquake-activated shelf security system has a pair of guide rails 505 mounted to a shelf unit 520. A movable retainer 515 has looped ends 510 and a mesh net 565 connected to retainer 515. As retainer 515 moves along guide rails 505, mesh net 565 unrolls and secures item on shelf unit 520. A top portion of mesh net 565 is mounted to shelf unit 520 so that mesh net 565 is constrained to cover the shelf opening. The top portion of mesh net 565 may be attached to shelf unit 520 using glue, hook and loop fasteners or any other suitable attachment means as is known in the art. In this embodiment, no retainer stop is used since mesh net 565 automatically retrains retainer from moving down further once unrolled to a fully deployed position.

Figure 25:
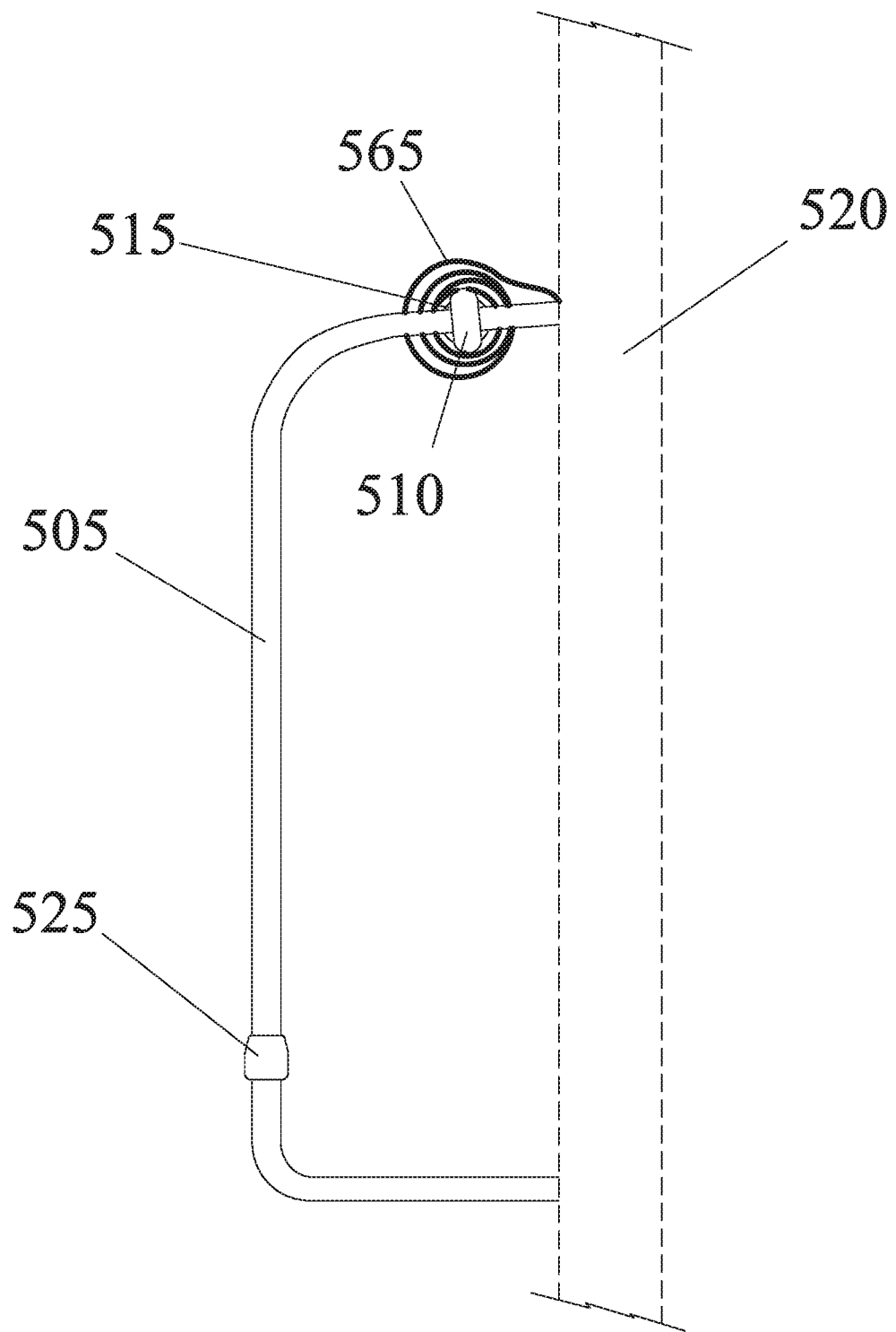
FIG. 25 is a side view of an earthquake-activated shelf security system according to yet another embodiment of the present invention having a mesh net and a retainer stop.

Referring now to FIG. 25, the earthquake-activated shelf security system operates essentially as described above with respect to FIG. 24; however, a retainer stop 525 is provided to allow additionally adjustability of mesh net 565.

Although the instant invention has been described in relation to particular embodiments thereof, many other variations and modifications and other uses will become apparent to those skilled in the art.

What is claimed is:

1. An earthquake-activated shelf security system attached to a shelving unit comprising:
    a first guide rail having a first retainer rest portion disposed along a top portion thereon;
    a second guide rail having a second retainer rest portion disposed along a top portion thereon;
    said first and second guide rails being attached to said shelf and having a portion generally perpendicular to said shelf;
    said first and second retainer rest portion forming a selected angle from a horizontal axis wherein a forward portion of said retainer rest portion is lower than a rearward portion;
    a movable retainer;
    said moveable retainer having distally disposed first and second ends;
    said distally disposed first and second ends each having a looped rotatable portion; and
    said looped rotatably portions adapted to moveably slide along said first and second guide rails whereby said moveable retainer is constrained by said first and second guide rails whereby said retainer moves to a position to keep items stored on said shelf from falling off during a shaking event.

2. The earthquake-activated shelf security system attached to a shelving unit of claim 1 further comprising a retainer stop disposed on each of said first and second guide rails whereby said retainer is stopped from further movement.

3. The earthquake-activated shelf security system attached to a shelving unit of claim 2 whereby said retainer stop is adjustable along said guide rails.

4. The earthquake-activated shelf security system attached to a shelving unit of claim 1 further comprising a flexible sheet having a top portion and a bottom portion;
    said top portion fixedly attached to an upper portion of a shelf;
    said bottom portion being attached to said retainer whereby said flexible sheet is adapted to further restrain items from falling from said shelf during said shaking event.

5. The earthquake-activated shelf security system attached to a shelving unit of claim 4 wherein said flexible sheet is a mesh net.

6. The earthquake-activated shelf security system attached to a shelving unit of claim 2 further comprising a flexible sheet having a top portion and a bottom portion;
    said top portion fixedly attached to an upper portion of a shelf;
    said bottom portion being attached to said retainer whereby said flexible sheet is adapted to further restrain items from falling from said shelf during said shaking event.

* * * * *